(12) United States Patent
Iftime et al.

(10) Patent No.: US 7,708,396 B2
(45) Date of Patent: May 4, 2010

(54) PHOTOCHROMIC PHASE CHANGE INKS

(75) Inventors: Gabriel Iftime, Mississauga (CA);
Christopher A Wagner, Etobicoke (CA); C. Geoffrey Allen, Waterdown (CA); Paul F Smith, Oakville (CA); Edward G Zwartz, Mississauga (CA); Peter G Odell, Mississauga (CA); Peter M Kazmaier, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 1091 days.

(21) Appl. No.: 11/276,679

(22) Filed: Mar. 9, 2006

(65) Prior Publication Data
US 2007/0211124 A1 Sep. 13, 2007

(51) Int. Cl.
*G01D 11/00* (2006.01)
(52) U.S. Cl. .............................. 347/99; 347/103; 347/88
(58) Field of Classification Search .................. 347/88, 347/99, 100, 95, 103; 523/160; 106/31.6, 106/31.13, 31.27
See application file for complete search history.

(56) References Cited

U.S. PATENT DOCUMENTS

| | | | |
|---|---|---|---|
| 4,251,824 A | 2/1981 | Hara et al. | |
| 4,410,899 A | 10/1983 | Haruta et al. | |
| 4,412,224 A | 10/1983 | Sugitani | |
| 4,490,731 A | 12/1984 | Vaught | |
| 4,532,530 A | 7/1985 | Hawkins | |
| 4,601,777 A | 7/1986 | Hawkins et al. | |
| 4,927,180 A | 5/1990 | Trundle | |
| 5,006,170 A | 4/1991 | Schwarz et al. | |
| 5,122,187 A | 6/1992 | Schwarz et al. | |
| 5,593,486 A * | 1/1997 | Oliver et al. | 347/99 |
| 5,807,625 A * | 9/1998 | Amon et al. | 428/195.1 |
| 6,329,453 B1 * | 12/2001 | Meinhardt et al. | 347/100 |
| 6,517,618 B2 | 2/2003 | Foucher et al. | |
| 6,547,380 B2 | 4/2003 | Smith et al. | |
| 6,616,964 B1 | 9/2003 | Hampp et al. | |
| 6,858,070 B1 | 2/2005 | Wong et al. | |
| 6,878,198 B1 | 4/2005 | Drappel et al. | |
| 6,906,118 B2 | 6/2005 | Goodbrand et al. | |
| 2005/0269556 A1* | 12/2005 | Evans et al. | 252/586 |

* cited by examiner

*Primary Examiner*—Manish S Shah
(74) *Attorney, Agent, or Firm*—Oliff & Berridge, PLC

(57) ABSTRACT

An ink set is made up of at least three differently colored phase change inks, for example cyan, magenta and yellow, wherein at least one of the colored phase change inks is a photochromic ink that contains a photochromic material. Upon exposure to activating radiation such as ultraviolet light, the at least one photochromic ink changes to a color different from the color of the photochromic ink prior to exposure to the activating radiation.

29 Claims, No Drawings

PHOTOCHROMIC PHASE CHANGE INKS

BACKGROUND

Described herein are inks such as solid phase change or hot melt inks that may be used in a number of copying and printing devices, inclusive of printing transient information on an image receiving substrate.

In embodiments, an advantage associated with the phase change inks disclosed herein is that the ink may be used in place of a conventional non-photochromic ink of the same color, thereby permitting the formation of images using a conventional ink jet printing device and not usually needing an additional dedicated photochromic ink channel for overprinting with a colorless photochromic ink. An additional advantage associated with the use of the colored photochromic inks illustrated herein is that the gloss of the colored photochromic ink may be substantially matched to other inks used in an ink set, thereby substantially eliminating differential gloss that may be realized when overprinting documents with a conventional colorless photochromic ink.

The phase change ink compositions illustrated herein in embodiments are solid at room temperature, for example from about 23° C. to about 27° C. and are suitable for ink jet printing processes, particularly thermal ink jet printing processes.

REFERENCES

Ink jetting devices are well known in the art. As described in U.S. Pat. No. 6,547,380, the disclosure of which is totally incorporated herein by reference, ink jet printing systems are generally of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field that adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium. There are generally three types of drop-on-demand ink jet systems. One type of drop-on-demand system is a piezoelectric device that has as its major components an ink filled channel or passageway having a nozzle on one end and a piezoelectric transducer near the other end to produce pressure pulses. Another type of drop-on-demand system is known as acoustic ink printing. As is known, an acoustic beam exerts a radiation pressure against objects upon which it impinges. Thus, when an acoustic beam impinges on a free surface (i.e., liquid/air interface) of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power. Still another type of drop-on-demand system is known as thermal ink jet, or bubble jet, and produces high velocity droplets. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink vehicle (usually water) in the immediate vicinity to vaporize almost instantaneously and create a bubble. The ink at the orifice is forced out as a propelled droplet as the bubble expands.

In a typical design of a piezoelectric ink jet device, the image is applied by jetting appropriately colored inks during four to eighteen rotations (incremental movements) of a substrate such as an image receiving member or intermediate transfer member with respect to the ink jetting head, i.e., there is a small translation of the printhead with respect to the substrate in between each rotation. This approach simplifies the printhead design, and the small movements ensure good droplet registration. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops. Thermal ink jet processes are well known and are described, for example, in U.S. Pat. Nos. 4,601,777, 4,251,824, 4,410,899, 4,412,224 and 4,532,530, the disclosures of each of which are totally incorporated herein by reference.

Inkjet printing processes may employ inks that are solid at room temperature and liquid at elevated temperatures. Such inks may be referred to as hot melt inks or phase change inks. For example, U.S. Pat. No. 4,490,731, the disclosure of which is totally incorporated herein by reference, discloses an apparatus for dispensing solid ink for printing on a substrate such as paper. In thermal ink jet printing processes employing hot melt inks, the solid ink is melted by the heater in the printing apparatus and utilized (i.e., jetted) as a liquid in a manner similar to that of conventional thermal ink jet printing. Upon contact with the printing substrate, the molten ink solidifies rapidly, enabling the colorant to substantially remain on the surface of the substrate instead of being carried into the substrate (for example, paper) by capillary action, thereby enabling higher print density than is generally obtained with liquid inks. Advantages of a phase change ink in ink jet printing are thus elimination of potential spillage of the ink during handling, a wide range of print density and quality, minimal paper cockle or distortion, and enablement of indefinite periods of nonprinting without the danger of nozzle clogging, even without capping the nozzles.

U.S. Pat. Nos. 5,006,170 and 5,122,187, the disclosures of each of which are totally incorporated herein by reference, disclose hot melt ink compositions suitable for ink jet printing which comprise a colorant, a binder, and a propellant.

U.S. Pat. No. 5,593,486, the disclosure of which is totally incorporated herein by reference, describes a hot melt ink composition comprising (a) an ink vehicle that is solid at about 25° C. and having a viscosity of from about 1 to about 20 centipoise at a temperature suitable for hot melt ink jet printing, the temperature being greater than about 45° C., (b) a photochromic material, (c) an optional colorant, and (d) an optional propellant.

U.S. Pat. No. 6,329,453, the disclosure of which is totally incorporated herein by reference, describes a photochromic phase change ink composition that contains (A) at least one selected polymeric and photochromic yellow phase change colorant and (B) a phase change ink carrier composition comprising (1) a resin selected from the group consisting of a urethane resin, a mixed urethane/urea resin and mixtures thereof; and (2) a mono-amide.

It is desirable in many commercial fields to provide validation or security markings to products or documents in order to make forgery or counterfeiting more difficult. U.S. Pat. No.

4,927,180, the disclosure of which is totally incorporated herein by reference, describes a method of marking an article or substrate with a mark or device that is made visible or is enhanced on exposure to UV light, comprising printing onto the article or substrate a photochromic ink containing a photochromic compound that is reversibly converted to a colored form on exposure to UV light and reverts to a substantially colorless form in the absence of UV light, and applying a superficial protective layer to the mark or device to protect the photochromic compound against degradation by atmospheric moisture and oxygen.

A multicolor image may be overprinted with a substantially clear photochromic ink, for example to form a printed hidden message, authentication code, etc., on the printed image. The printed hidden information may be revealed by subjecting the image to UV light so that the photochromic material reversibly changes color to become temporarily visible. However, this method requires the printing device to have a separate ink channel therein dedicated to the photochromic ink, an expensive proposition given that most ink jetting devices are equipped with four ink channels, one for each color of a conventional four color ink set of cyan, yellow, magenta and black.

SUMMARY

While known compositions and processes are suitable for their intended purposes, a need remains for a photochromic colored phase change ink composition capable of being concurrently printed with other inks in forming a multicolor image, such that the ink may be used to form an image having photochromic characteristics, and may be used in an ink jet device free of a separate dedicated channel for the photochromic ink.

Described herein is an ink set comprised of at least three differently colored phase change inks, wherein at least one of the colored phase change inks is a photochromic ink that contains a photochromic material such that upon exposure to activating radiation, the at least one photochromic ink changes to a color different from the color of the photochromic ink prior to exposure to the activating radiation.

Also described herein is an ink set comprising at least four differently colored phase change inks and including at least a cyan phase change ink, a magenta phase change ink, a yellow phase change ink and a black phase change ink, wherein at least one of the magenta phase change ink or the yellow phase change ink is a photochromic ink that contains a photochromic material such that upon exposure to activating radiation, the photochromic ink changes to a color different from the color of the photochromic ink prior to exposure to the activating radiation.

Still further, described herein is an ink jet system, comprising an ink set comprised of at least three differently colored phase change inks, wherein at least one of the colored phase change inks is a photochromic ink that contains a photochromic material such that upon exposure to activating radiation, the at least one photochromic ink changes to a color different from the color of the photochromic ink prior to exposure to the activating radiation; and an ink jet device including an ink jet head consisting of one channel for each one of the differently colored phase change inks in the ink set, and a supply path that supplies each of the differently colored phase change inks to the respective channels of the ink jet head from reservoirs containing each of the differently colored phase change inks.

Also described is an image forming process, comprising providing each ink of an ink set comprised of at least three differently colored phase change inks, wherein at least one of the colored phase change inks is a photochromic ink that contains a photochromic material such that upon exposure to activating radiation, the at least one photochromic ink changes to a color different from the color of the photochromic ink prior to exposure to the activating radiation, to a corresponding channel of an ink jet head of an ink jet device; heating the ink jet head to a jetting temperature of the phase change inks of the ink set, thereby rendering each of the phase change inks molten; and concurrently ejecting droplets of each of the molten inks of the ink set in an imagewise pattern onto an image receiving substrate.

Embodiments also relate to a process for authenticating a color document, comprising forming the document via an image forming process with an ink set comprised of at least three differently colored phase change inks, wherein at least one of the colored phase change inks is a photochromic ink that contains a photochromic material that upon exposure to activating radiation, the photochromic ink changes to a color different from the color of the photochromic ink prior to exposure to the activating radiation, and exposing the document to the activating radiation to generate a color change in the photochromic ink indicating the authenticity of the document.

The ink sets and ink jet system form images which appear normal under incandescent light, but are able to change color and/or appearance upon exposure to UV light. As such, the ink sets and ink jet system enable images to be formed that contain embedded information enabling authentication and making copying/counterfeiting difficult, or that make unique images, for example for use in presentations in which the images may be made to change appearance, and that form such images in an efficient manner with existing ink jet devices.

Embodiments

Examples of the phase change inks of the ink sets herein are inks that include an ink vehicle that is solid at temperatures of about 23° C. to about 27° C., for example room temperature, and specifically are solid at temperatures below about 40° C. However, the inks change phase upon heating, and are in a molten state at jetting temperatures. Thus, the inks have a viscosity of from about 1 to about 20 centipoise (cp), for example from about 5 to about 15 cp or from about 8 to about 12 cp, at an elevated temperature suitable for ink jet printing, for example temperatures of from about 60° C. to about 150° C.

In this regard, the inks herein may be either low energy inks or high energy inks. Low energy inks are solid at a temperature below about 40° C. and have a viscosity of from about 5 to about 15 centipoise at a jetting temperature of from about 80° C. to about 150° C., for example from about 90° C. to about 130° C. or from about 110° C. to about 120° C. High energy inks are solid at a temperature below 40° C. and have a viscosity of from about 5 to about 15 centipoise at a jetting temperature of from about 100° C. to about 180° C., for example from 120° C. to about 160° C. or from about 125° C. to about 150° C.

Any suitable ink vehicle can be employed. Suitable vehicles can include paraffins, microcrystalline waxes, polyethylene waxes, ester waxes, fatty acids and other waxy materials, fatty amide containing materials, sulfonamide materials, resinous materials made from different natural sources (tall oil rosins and rosin esters, for example), and many synthetic resins, oligomers, polymers, and copolymers such as further discussed below.

Examples of suitable ink vehicles include, for example, ethylene/propylene copolymers, such as those available from Petrolite and of the general formula

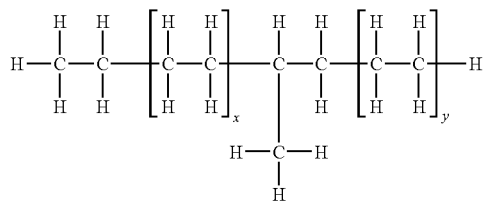

wherein y represents an integer from 0 to about 30, for example from 0 to about 20 or from 0 to about 10 and x is equal to about 21−y. The copolymers may have, for example, a melting point of from about 70° C. to about 150° C., such as from about 80° C. to about 130° C. or from about 90° C. to about 120° C. and a molecular weight range of from about 500 to about 4,000. Commercial examples of such copolymers include, for example, Petrolite CP-7 (Mn=650), Petrolite CP-11 (Mn=1,100, Petrolite CP-12 (Mn=1,200) and the like.

Urethane derivatives of oxidized synthetic or petroleum waxes, such as those available from Petrolite and of the general formulas

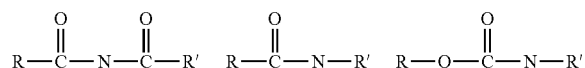

wherein R is an alkyl group of the formula $CH_3(CH_2)_n$, n is an integer of from about 5 to about 400, for example from about 10 to about 300 or from about 20 to about 200 and R' is a tolyl group, may also be used as the ink vehicle. These materials may have a melting point of from about 60° C. to about 120° C., such as from about 70° C. to about 100° C. or from about 70° C. to about 90° C. Commercial examples of such materials include, for example, Petrolite CA-11 (Mn=790, Mw/Mn=2.2), Petrolite WB-5 (Mn=650, Mw/Mn=1.7), Petrolite WB-17 (Mn=730, Mw/Mn=1.8), and the like.

Another type of ink vehicle may be n-paraffinic, branched paraffinic, and/or naphthenic hydrocarbons, typically with from about 5 to about 100, such as from about 20 to about 180 or from about 30 to about 60 carbon atoms, generally prepared by the refinement of naturally occurring hydrocarbons, such as BE SQUARE 185 and BE SQUARE 195, with molecular weights (Mn) of from about 100 to about 5,000, such as from about 250 to about 1,000 or from about 500 to about 800, for example such as available from Petrolite.

Highly branched hydrocarbons, typically prepared by olefin polymerization, such as the VYBAR materials available from Petrolite, including VYBAR 253 (Mn=520), VYBAR 5013 (Mn=420), and the like, may also be used. In addition, the ink vehicle may be an ethoxylated alcohol, such as available from Petrolite and of the general formula

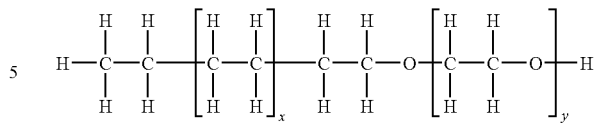

wherein x is an integer of from about 1 to about 50, such as from about 5 to about 40 or from about 11 to about 24 and y is an integer of from about 1 to about 70, such as from about 1 to about 50 or from about 1 to about 40. The materials may have a melting point of from about 60° C. to about 150° C., such as from about 70° C. to about 120° C. or from about 80° C. to about 110° C. and a molecular weight (Mn) range of from about 100 to about 5,000, such as from about 500 to about 3,000 or from about 500 to about 2,500. Commercial examples include UNITHOX 420 (Mn=560), UNITHOX 450 (Mn=900), UNITHOX 480 (Mn=2,250), UNITHOX 520 (Mn=700), UNITHOX 550 (Mn=1,100), UNITHOX 720 (Mn=875), UNITHOX 750 (Mn=1,400), and the like.

As an additional example, the ink vehicle may be made of fatty amides, such as monoamides, tetra-amides, mixtures thereof, and the like, for example such as described in U.S. Pat. No. 6,858,070, incorporated herein by reference. Suitable monoamides may have a melting point of at least about 50° C., for example from about 50° C. to about 150° C., although the melting point can be below this temperature. Specific examples of suitable monoamides include, for example, primary monoamides and secondary monoamides. Stearamide, such as KEMAMIDE S available from Witco Chemical Company and CRODAMIDE S available from Croda, behenamide/arachidamide, such as KEMAMIDE B available from Witco and CRODAMIDE BR available from Croda, oleamide, such as KEMAMIDE U available from Witco and CRODAMIDE OR available from Croda, technical grade oleamide, such as KEMAMIDE O available from Witco, CRODAMIDE O available from Croda, and UNISLIP 1753 available from Uniqema, and erucamide such as KEMAMIDE E available from Witco and CRODAMIDE ER available from Croda, are some examples of suitable primary amides. Behenyl behenamide, such as KEMAMIDE EX666 available from Witco, stearyl stearamide, such as KEMAMIDE S-180 and KEMAMIDE EX-672 available from Witco, stearyl erucamide, such as KEMAMIDE E-180 available from Witco and CRODAMIDE 212 available from Croda, erucyl erucamide, such as KEMAMIDE E-221 available from Witco, oleyl palmitamide, such as KEMAMIDE P-181 available from Witco and CRODAMIDE 203 available from Croda, and erucyl stearamide, such as KEMAMIDE S-221 available from Witco, are some examples of suitable secondary amides. Additional suitable amide materials include KEMAMIDE W40 (N,N'-ethylenebisstearamide), KEMAMIDE P181 (oleyl palmitamide), KEMAMIDE W45 (N,N'-thylenebisstearamide), and KEMAMIDE W20 (N,N'-ethylenebisoleamide).

High molecular weight linear alcohols, such as those available from Petrolite and of the general formula

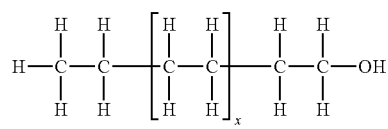

wherein x is an integer of from about 1 to about 50, such as from about 5 to about 35 or from about 11 to about 23, may also be used as the ink vehicle. These materials may have a melting point of from about 50° C. to about 150° C., such as from about 70° C. to about 120° C. or from about 75° C. to about 110° C., and a molecular weight (Mn) range of from about 100 to about 5,000, such as from about 200 to about 2,500 or from about 300 to about 1,500. Commercial examples include the UNILIN materials such as UNILIN 425 (Mn=460), UNILIN 550 (Mn=550), UNILIN 700 (Mn=700), and the like.

A still further example includes hydrocarbon-based waxes, such as the homopolymers of polyethylene available from Petrolite and of the general formula

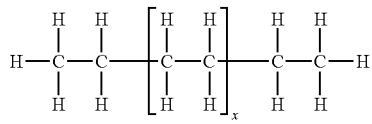

wherein x is an integer of from about 1 to about 200, such as from about 5 to about 150 or from about 12 to about 105. These materials may have a melting point of from about 60° C. to about 150° C., such as from about 70° C. to about 140° C. or from about 80° C. to about 130° C. and a molecular weight (Mn) of from about 100 to about 5,000, such as from about 200 to about 4,000 or from about 400 to about 3,000. Example waxes include the line of waxes, such as POLY-WAX 500 (Mn=500), POLYWAX 655 (Mn=655), POLY-WAX 850 (Mn=850), POLYWAX 1000 (Mn=1,000), and the like.

Another example includes modified maleic anhydride hydrocarbon adducts of polyolefins prepared by graft copolymerization, such as those available from Petrolite and of the general formulas

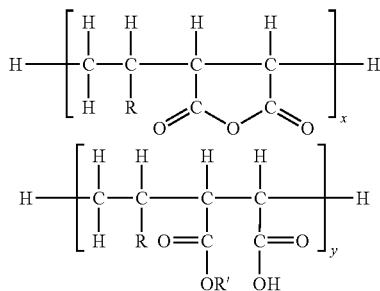

wherein R is an alkyl group with from about 1 to about 50, such as from about 5 to about 35 or from about 6 to about 28 carbon atoms, R' is an ethyl group, a propyl group, an isopropyl group, a butyl group, an isobutyl group, or an alkyl group with from about 5 to about 500, such as from about 10 to about 300 or from about 20 to about 200 carbon atoms, x is an integer of from about 9 to about 13, and y is an integer of from about 1 to about 50, such as from about 5 to about 25 or from about 9 to about 13, and having melting points of from about 50° C. to about 150° C., such as from about 60° C. to about 120° C. or from about 70° C. to about 100° C.; those available from Petrolite and of the general formula

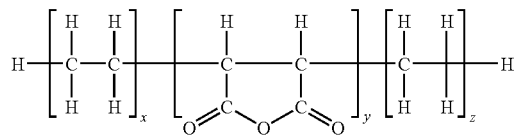

wherein R is an alkyl group with from about 1 to about 50, such as from about 5 to about 35 or from about 6 to about 28 carbon atoms, x is an integer of from about 1 to about 50, such as from about 5 to about 25 or from about 9 to about 13, y is 1 or 2, and z is an integer of from about 1 to about 50, such as from about 5 to about 25 or from about 9 to about 13; and those available from Petrolite and of the general formula

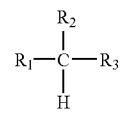

wherein $R_1$ and $R_3$ are hydrocarbon groups and $R_2$ is either of one of the general formulas

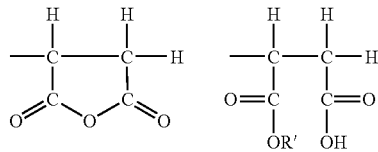

or a mixture thereof, wherein R' is an isopropyl group, which materials may have melting points of from about 70° C. to about 150° C., such as from about 80° C. to about 130° C. or from about 90° C. to about 125° C., with examples of modified maleic anhydride copolymers including CERAMER 67 (Mn=655, Mw/Mn=1.1), CERAMER 1608 (Mn=700, Mw/Mn=1.7), and the like.

Additional examples of suitable ink vehicles for the phase change inks include rosin esters; polyamides; dimer acid amides; fatty acid amides, including ARAMID C; epoxy resins, such as EPOTUF 37001, available from Riechold Chemical Company; fluid paraffin waxes; fluid microcrystalline waxes; Fischer-Tropsch waxes; polyvinyl alcohol resins; polyols; cellulose esters; cellulose ethers; polyvinyl pyridine resins; fatty acids; fatty acid esters; poly sulfonamides, including KETJENFLEX MH and KETJENFLEX MS80; benzoate esters, such as BENZOFLEX S552, available from Velsicol Chemical Company; phthalate plasticizers; citrate plasticizers; maleate plasticizers; sulfones, such as diphenyl sulfone, n-decyl sulfone, n-amyl sulfone, chlorophenyl methyl sulfone; polyvinyl pyrrolidinone copolymers; polyvinyl pyrrolidone/polyvinyl acetate copolymers; novolac resins, such as DUREZ 12 686, available from Occidental Chemical Company; and natural product waxes, such as beeswax, monton wax, candelilla wax, GILSONITE (American Gilsonite Company), and the like; mixtures of linear primary alcohols with linear long chain amides or fatty acid amides, such as those with from about 6 to about 24 carbon atoms, including PARICIN 9 (propylene glycol monohydroxystearate), PARICIN 13 (glycerol monohydroxystearate), PARICIN 15 (ethylene glycol monohydroxystearate), PARICIN 220 (N(2-hydroxyethyl)-12-hydroxystearamide), PARICIN 285 (N,N'-ethylene-bis-12-hydroxystearamide), FLEXRICIN 185 (N,N'-ethylene-bis-ricinoleamide), and the like. Further, linear long chain sulfones with from about 4 to about 16 carbon atoms, such as n-propyl sulfone, n-pentyl sulfone, n-hexyl sulfone, n-heptyl sulfone, n-octyl sulfone, n-nonyl sulfone, n-decyl sulfone, n-undecyl sulfone, n-dodecyl sulfone, n-tridecyl sulfone, n-tetradecyl sulfone, n-pentadecyl sulfone, n-hexadecyl sulfone, and the like, are suitable ink vehicle materials.

In addition, the ink vehicles described in U.S. Pat. No. 6,906,118, incorporated herein by reference, may also be used. Also suitable as ink vehicles are liquid crystalline materials as disclosed in, for example, U.S. Pat. No. 5,122,187, the disclosure of which is totally incorporated herein by reference.

The ink vehicle may comprise one or more of the aforementioned suitable materials.

The ink vehicles for the phase change inks may have melting points of from about 60° C. to about 150° C., for example from about 80° C. to about 120° C. or from about 85° C. to about 110° C., as determined by, for example, observation and measurement on a microscope hot stage, wherein the binder material is heated on a glass slide and observed by microscope. Higher melting points are also acceptable, although printhead life may be reduced at temperatures higher than 150° C.

In addition, the surface tension of the binder at the operating (jetting) temperature of the ink should be from about 20 to about 65 dynes per centimeter, for example from about 40 to about 65 dynes per centimeter, to enhance refill rates, paper wetting, and color mixing. The operating, or jetting, temperatures of the phase change inks generally are from about 60° C. to about 150° C. The viscosity of the ink at the operating temperature of the ink is generally from about 1 to about 20 cp, for example from about 1 to about 15 cp or from about 5 to about 15 cp.

The ink vehicle may comprise from about 25% to about 99.5% by weight of the ink, for example from about 30% to about 90% or from about 50% to about 85% by weight of the ink.

Photochromic, or photochromic ink, refers to, for example, the capability to change color from a first color state to a second color state different from the first color state, after exposure to an activating radiation, for example a radiation source having a wavelength from about 100 nm to about 1100 nm. The activating radiation may thus be in the ultraviolet (UV), visible or infrared regions, although the use of activating radiation in the UV region (from about 100 nm to about 400 nm) is most common. The change of color, or absorption behavior, may occur instantaneously on exposure to the activating radiation, or may occur after overcoming any activation phase. The color change exhibited by the photochromic ink is ideally reversible, but should last for a time period permitting the color change to be detected, for example a time frame of from about 0.5 second to about 1 hour or more. Reversibility, or color cancellation, of the color change may be accelerated, for example by heating, by exposure to a distinct wavelength radiation different from that of the first coloration, and the like.

The photochromic effect (photochromism) in general is thus a reversible change of a chemical species between two states having distinguishably different absorption spectra (color), wherein the change is induced in at least one direction by the action of activating electromagnetic radiation. The chemical species exhibiting photochromism may be a molecule or an ion, and the reversible change in states may be a conversion between two molecules or ions, or the dissociation of a single molecule or ion into two or more species, with the reverse change being a recombination of the two or more species thus formed into the original molecule or ion.

In embodiments, the ink set herein comprises at least three differently colored phase change inks, with at least one of the colored phase change inks being a photochromic ink that contains a photochromic material such that upon exposure to activating radiation, the at least one photochromic ink changes to a color different from the color of any of the at least three differently colored phase change inks.

Color refers to, for example, the overall absorption characteristic within the same range of wavelengths of the electromagnetic spectrum. Thus, differently colored inks exhibit a color, that is, an absorption characteristic, different from each other. For example, if a first ink exhibits a yellow color, then a second differently colored ink will exhibit a different shade of yellow or a different color altogether, for example such as cyan or magenta. In an embodiment of a three color ink herein, the three inks of the ink set may comprise the three subtractive primary colors yellow, cyan and magenta, or may comprise red, blue and green. An example four color ink set may comprise yellow, cyan, magenta and black. Additional differently colored inks, for example for highlight coloring inks, may be included in these ink sets.

It is desirable for the color change of the photochromic ink upon exposure to the activating radiation to be discernible to a viewer. As such, it is desirable for the color of the photochromic ink following exposure to the activating radiation to be different from the colors of the other inks in the ink set following such exposure. In this way, it is easier for a viewer to detect the color change in an image formed from the ink set after exposure to the activating radiation. Of course, it is also possible in embodiments for the photochromic ink to exhibit a color following exposure to activating radiation that is the same as another color of the ink set.

In embodiments, only one of the inks of the ink set is a photochromic ink. For example, the photochromic ink in an ink set of cyan, magenta, yellow, optionally with black, is one of these colored inks. The photochromic ink of the ink set may be an ink having a color that does not mask a color change upon exposure to activating radiation. Thus, the photochromic ink may have a lighter hue, for example yellow or magenta. Of course, more than one ink of the ink set may be a photochromic ink, and in fact all may be photochromic inks.

Photochromic phenomena are observed in both organic compounds, such as anils, disulfoxides, hydrazones, osazones, semicarbazones, stilbene derivatives, o-nitrobenzyl derivatives, spiro compounds, and the like, and in inorganic compounds, such as metal oxides, alkaline earth metal sulfides, titanates, mercury compounds, copper compounds, minerals, transition metal compounds such as carbonyls, and the like. Inks containing photochromic components could be used as a security ink, watermark or to create some other means for authenticating a document.

Examples of suitable photochromic materials include compounds that undergo heterolytic cleavage, such as spiropyrans and related compounds, and the like; compounds that undergo homolytic cleavage, such as bis-imidazole compounds, bis-tetraphenylpyrrole, hydrazine compounds, aryl disulfide compounds, and the like; compounds that undergo cis-trans isomerization, such as stilbene compounds, photoisomerizable azo compounds, and the like; compounds that undergo photochromic tautomerism, including those that undergo hydrogen transfer phototautomerism, those that undergo photochromic valence tautomerism, and the like; and others. Mixtures of two or more photochromic materials may be used together in any suitable ratio.

Specific examples of photochromic materials include spiropyrans, for example of the general formula

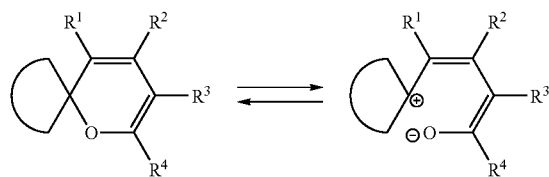

wherein $R^1$, $R^2$, $R^3$, and $R^4$ each, independently of the others, may be hydrogen, alkyl, including cyclic alkyl groups, such as cyclopropyl, cyclohexyl, and the like, and including unsaturated alkyl groups, such as vinyl ($H_2C=CH—$), allyl ($H_2C=CH—CH_2—$), propynyl ($HC≡C—CH_2—$), and the like, and having from 1 to about 50 carbon atoms, such as from 1 to about 30 carbon atoms, aryl, such as having from about 5 to about 30 carbon atoms, for example from about 5 to about 20 carbon atoms, arylalkyl, such as having from about 6 to about 50 carbon atoms, for example from about 6 to about 30 carbon atoms, silyl groups, nitro groups, cyano groups, halide atoms, such as fluoride, chloride, bromide, iodide, and astatide, amine groups, including primary, secondary, and tertiary amines, hydroxy groups, alkoxy groups, such as having from 1 to about 50 carbon atoms, for example from 1 to about 30 carbon atoms, aryloxy groups, such as having from about 5 to about 30 carbon atoms, for example from about 5 to about 20 carbon atoms, alkylthio groups, such as having from 1 to about 50 carbon atoms, for example from 1 to about 30 carbon atoms, arylthio groups, such as having from about 5 to about 30 carbon atoms, for example from about 5 to about 20 carbon atoms, aldehyde groups, ketone groups, ester groups, amide groups, carboxylic acid groups, sulfonic acid groups, and the like. The alkyl, aryl, and arylalkyl groups may also be substituted with groups such as, for example, silyl groups, nitro groups, cyano groups, halide atoms, such as fluoride, chloride, bromide, iodide, and astatide, amine groups, including primary, secondary, and tertiary amines, hydroxy groups, alkoxy groups, such as having from 1 to about 20 carbon atoms, for example from 1 to about 10 carbon atoms, aryloxy groups, such as having from about 5 to about 20 carbon atoms, for example from about 5 to about 10 carbon atoms, alkylthio groups, such as having from 1 to about 20 carbon atoms, for example from 1 to about 10 carbon atoms, arylthio groups, such as having from about 5 to about 20 carbon atoms, for example from about 5 to about 10 carbon atoms, aldehyde groups, ketone groups, ester groups, amide groups, carboxylic acid groups, sulfonic acid groups, and the like. Further, two or more R groups can be joined together to form a ring.

Examples of spiropyrans include spiro[2H-1-benzopyran-2,2'-indolines], including those of the general formula

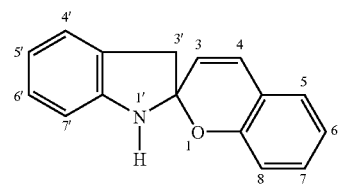

wherein substituents can be present on one or more of the 1', 3', 4', 5', 6', 7', 3, 4, 5, 6, 7, and 8 positions, spiroindolinonaphthopyrans, including those of the general formula

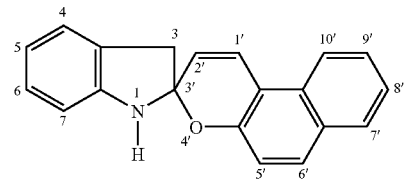

wherein substituents can be present on one or more of the 1, 3, 4, 5, 6, 7, 1', 2', 5', 6', 7', 8', 9', or 10' positions, spiro[2H-1-benzopyran-2,2'benzothiazolines], including those of the general formula

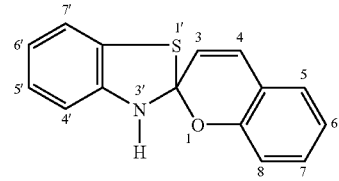

wherein substituents can be present on one or more of the 1', 3', 4', 5', 6', 7', 3, 4, 5, 6, 7, and 8 positions, spiro[2H-1-benzopyran-2,2'-benzoxazolines], including those of the general formula wherein substituents can be present on one or more of the 1', 3', 4', 5', 6', 7', 3, 4, 5, 6, 7, and 8 positions, spiropyranopyrans, including those of the general formula

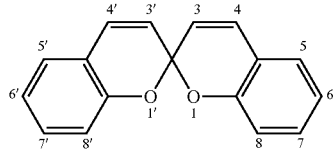

wherein substituents can be present on one or more of the 3, 4, 5, 6, 7, 8, 3', 4', 5', 6', 7', and 8' positions, aza-spiroindolinopyrans, including those of the general formula

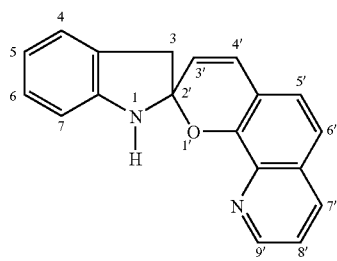

wherein substituents can be present on one or more of the 3, 4, 5, 6, 7, 3', 4', 5', 6', 7', 8', and 9' positions, spiro(quinolinopyrans), including those of the general formula

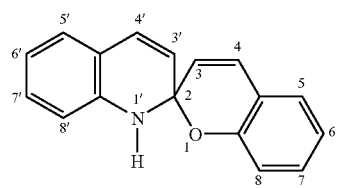

wherein substituents can be present on one or more of the 3, 4, 5, 6, 7, 8, 3', 4', 5', 6', 7', and 8' positions, spiro(pyridino pyrans), including those of the general formula

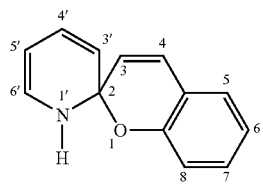

wherein substituents can be present on one or more of the 3, 4, 5, 6, 7, 8, 3', 4', 5', and 6' positions, and the like.

Also suitable are spirooxazines, for example of the general formula

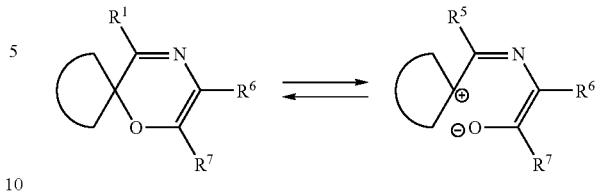

wherein $R^5$, $R^6$, and $R^7$ each, independently of the others, may be hydrogen, alkyl, including cyclic alkyl groups, such as cyclopropyl, cyclohexyl, and the like, and including unsaturated alkyl groups, such as vinyl ($H_2C=CH—$), allyl ($H_2C=CH—CH_2—$), propynyl ($HC\equiv C—CH_2—$), and the like, for example with from 1 to about 50 carbon atoms such as from 1 to about 30 carbon atoms, aryl, for example with from about 5 to about 30 carbon atoms such as from about 5 to about 20 carbon atoms, arylalkyl, for example from about 6 to about 50 carbon atoms such as from about 6 to about 30 carbon atoms, silyl groups, nitro groups, cyano groups, halide atoms, such as fluoride, chloride, bromide, iodide, and astatide, amine groups, including primary, secondary, and tertiary amines, hydroxy groups, alkoxy groups, for example from 1 to about 50 carbon atoms such as from 1 to about 30 carbon atoms, aryloxy groups, for example from about 5 to about 30 carbon atoms such as from about 5 to about 20 carbon atoms, alkylthio groups, for example from 1 to about 50 carbon atoms such as from 1 to about 30 carbon atoms, arylthio groups, for example from about 5 to about 30 carbon atoms such as from about 5 to about 20 carbon atoms, aldehyde groups, ketone groups, ester groups, amide groups, carboxylic acid groups, sulfonic acid groups, and the like. The alkyl, aryl, and arylalkyl groups may also be substituted with groups such as, for example, silyl groups, nitro groups, cyano groups, halide atoms, such as fluoride, chloride, bromide, iodide, and astatide, amine groups, including primary, secondary, and tertiary amines, hydroxy groups, alkoxy groups, for example with from 1 to about 20 carbon atoms such as from 1 to about 10 carbon atoms, aryloxy groups, for example from about 5 to about 20 carbon atoms such as from about 5 to about 10 carbon atoms, alkylthio groups, for example with from 1 to about 20 carbon atoms such as from 1 to about 10 carbon atoms, arylthio groups, for example with from about 5 to about 20 carbon atoms such as from about 5 to about 10 carbon atoms, aldehyde groups, ketone groups, ester groups, amide groups, carboxylic acid groups, sulfonic acid groups, and the like. Further, two or more R groups can be joined together to form a ring.

Examples of spirooxazines include spiro[indoline-2,3'-[3H]-naphtho[2,1-b]-1,4-oxazines], including those of the general formula

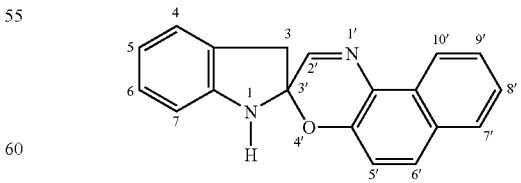

wherein substituents can be present on one or more of the 1, 3, 4, 5, 6, 7, 1', 2', 5', 6', 7', 8', 9', or 10' positions, spiro[2H-1,4-benzoxazine-2,2'-indolines including those of the general formula

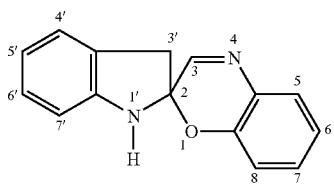

wherein substituents can be present on one or more of the 3, 5, 6, 7, 8, 1', 3', 4', 5', 6', and 7' positions, and the like.

As an example of the photochromism exhibited by spiro compounds, the following reaction scheme illustrates the transformation upon exposure to activating radiation, in this case UV light. The closed form of a spirooxazine compound is shown on the left. This form has no color. However, upon exposure to UV light, the open form of the compound, shown on the right, is generated. This form exhibits a color, unlike the form on the left. Thus, in a colored ink, the colored form of the spirooxazine following exposure to UV light will alter the color exhibited by the colored ink containing the photochromic material. Upon exposure to visible light, for example sun light or room light (incandescent light), the open form will revert to the closed form.

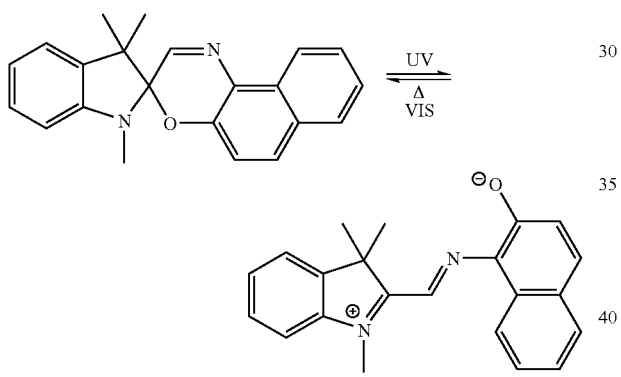

Also suitable as a photochromic material are spirothiopyrans, of the general formula

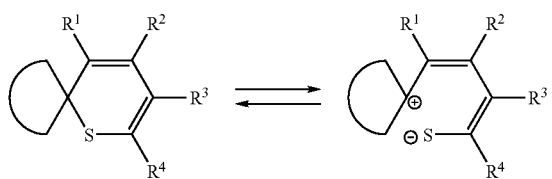

wherein $R^1$, $R^2$, $R^3$, and $R^4$ each, independently of the others, may be hydrogen, alkyl, including cyclic alkyl groups, such as cyclopropyl, cyclohexyl, and the like, and including unsaturated alkyl groups, such as vinyl ($H_2C$=CH—), allyl ($H_2C$=CH—$CH_2$—), propynyl (HC≡C—$CH_2$—), and the like, and having from 1 to about 50 carbon atoms, such as from 1 to about 30 carbon atoms, aryl, such as having from about 5 to about 30 carbon atoms, for example from about 5 to about 20 carbon atoms, arylalkyl, such as having from about 6 to about 50 carbon atoms, for example from about 6 to about 30 carbon atoms, silyl groups, nitro groups, cyano groups, halide atoms, such as fluoride, chloride, bromide, iodide, and astatide, amine groups, including primary, secondary, and tertiary amines, hydroxy groups, alkoxy groups, such as having from 1 to about 50 carbon atoms, for example from 1 to about 30 carbon atoms, aryloxy groups, such as having from about 5 to about 30 carbon atoms, for example from about 5 to about 20 carbon atoms, alkylthio groups, such as having from 1 to about 50 carbon atoms, for example from 1 to about 30 carbon atoms, arylthio groups, such as having from about 5 to about 30 carbon atoms, for example from about 5 to about 20 carbon atoms, aldehyde groups, ketone groups, ester groups, amide groups, carboxylic acid groups, sulfonic acid groups, and the like. The alkyl, aryl, and arylalkyl groups may also be substituted with groups such as, for example, silyl groups, nitro groups, cyano groups, halide atoms, such as fluoride, chloride, bromide, iodide, and astatide, amine groups, including primary, secondary, and tertiary amines, hydroxy groups, alkoxy groups, such as having from 1 to about 20 carbon atoms, for example from 1 to about 10 carbon atoms, aryloxy groups, such as having from about 5 to about 20 carbon atoms, for example from about 5 to about 10 carbon atoms, alkylthio groups, such as having from 1 to about 20 carbon atoms, for example from 1 to about 10 carbon atoms, arylthio groups, such as having from about 5 to about 20 carbon atoms, for example from about 5 to about 10 carbon atoms, aldehyde groups, ketone groups, ester groups, amide groups, carboxylic acid groups, sulfonic acid groups, and the like. Further, two or more R groups can be joined together to form a ring.

Examples of spirothiopyrans include spiro[2H-1-benzothiopyran-2,2'-indolines], including those of the general formula

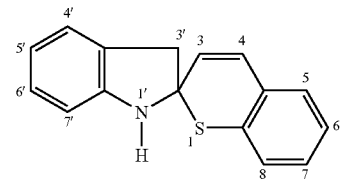

wherein substituents can be present on one or more of the 1', 3', 4', 5', 6', 7', 3, 4, 5, 6, 7, and 8 positions, and the like.

Substituents on the left ring of the spiropyrans, spirooxazines, and spirothiopyrans (represented by the loop in the generic structural formulas of these materials) can be adjusted to affect the color of the open form of the material. Substituents on the central moiety of the spiropyrans, spirooxazines, and spirothiopyrans or on alkyl or aryl groups attached thereto may also affect the color of the open form of the material, although to a lesser degree than substituents on the left ring. Further, when the left ring contains a nitrogen atom, this atom or other atoms may be substituted to affect the solubility of the compound in various liquids and resins. For example, long chain hydrocarbons, such as those with 16 or 18 carbon atoms, can increase solubility in hydrocarbons. Sulfonate and carboxylate groups, for example, can enhance water solubility.

Specific examples of the aforementioned spiropyrans, spirooxazines, and spirothiopyrans are described in U.S. Pat. No. 5,593,486, incorporated herein by reference in its entirety.

As additional photochromic materials, stilbene compounds, aromatic azo compounds, bisimidazoles, hydrazines, aryl disulfides, and mixtures thereof may also be used.

Stilbene compounds may be of the general formula

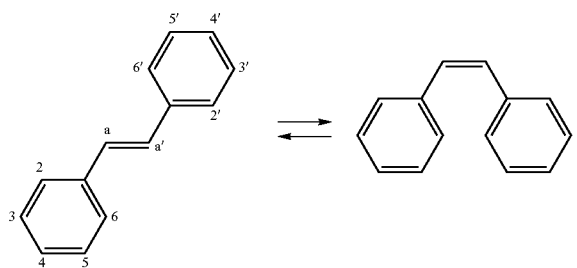

wherein substituents may be present at the 2, 3, 4, 5, 6, 2', 3', 4', 5' and 6' positions. Examples of suitable substituents include hydrogen, alkyl, including cyclic alkyl groups, such as cyclopropyl, cyclohexyl, and the like, and including unsaturated alkyl groups, such as vinyl ($H_2C\!=\!CH\!-\!$), allyl ($H_2C\!=\!CH\!-\!CH_2\!-\!$), propynyl ($HC\!\equiv\!C\!-\!CH_2\!-\!$), and the like, and having from 1 to about 50 carbon atoms, such as from 1 to about 30 carbon atoms, aryl, such as having from about 5 to about 30 carbon atoms, for example from about 5 to about 20 carbon atoms, arylalkyl, such as having from about 6 to about 50 carbon atoms, for example from about 6 to about 30 carbon atoms, silyl groups, nitro groups, cyano groups, halide atoms, such as fluoride, chloride, bromide, iodide, and astatide, amine groups, including primary, secondary, and tertiary amines, hydroxy groups, alkoxy groups, such as having from 1 to about 50 carbon atoms, for example from 1 to about 30 carbon atoms, aryloxy groups, such as having from about 5 to about 30 carbon atoms, for example from about 5 to about 20 carbon atoms, alkylthio groups, such as having from 1 to about 50 carbon atoms, for example from 1 to about 30 carbon atoms, arylthio groups, such as having from about 5 to about 30 carbon atoms, for example from about 5 to about 20 carbon atoms, aldehyde groups, ketone groups, ester groups, amide groups, carboxylic acid groups, sulfonic acid groups, and the like. The alkyl, aryl, and arylalkyl groups may also be substituted with groups such as, for example, silyl groups, nitro groups, cyano groups, halide atoms, such as fluoride, chloride, bromide, iodide, and astatide, amine groups, including primary, secondary, and tertiary amines, hydroxy groups, alkoxy groups, such as having from 1 to about 20 carbon atoms, for example from 1 to about 10 carbon atoms, aryloxy groups, such as having from about 5 to about 20 carbon atoms, for example from about 5 to about 10 carbon atoms, alkylthio groups, such as having from 1 to about 20 carbon atoms, for example from 1 to about 10 carbon atoms, arylthio groups, such as having from about 5 to about 20 carbon atoms, for example from about 5 to about 10 carbon atoms, aldehyde groups, ketone groups, ester groups, amide groups, carboxylic acid groups, sulfonic acid groups, and the like. Further, two or more R groups can be joined together to form a ring.

Aromatic azo compounds that exhibit photochromism may be of the general formula

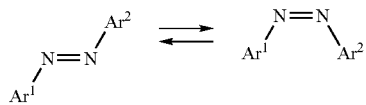

wherein $Ar^1$ and $Ar^2$ are each, independently of the other, selected from the group consisting of aromatic groups. The aromatic groups can be substituted, with examples of substituents including hydrogen, alkyl, including cyclic alkyl groups, such as cyclopropyl, cyclohexyl, and the like, and including unsaturated alkyl groups, such as vinyl ($H_2C\!=\!CH\!-\!$), allyl ($H_2C\!=\!CH\!-\!CH_2\!-\!$), propynyl ($HC\!\equiv\!C\!-\!CH_2\!-\!$), and the like, and having from 1 to about 50 carbon atoms, such as from 1 to about 30 carbon atoms, aryl, such as having from about 5 to about 30 carbon atoms, for example from about 5 to about 20 carbon atoms, arylalkyl, such as having from about 6 to about 50 carbon atoms, for example from about 6 to about 30 carbon atoms, silyl groups, nitro groups, cyano groups, halide atoms, such as fluoride, chloride, bromide, iodide, and astatide, amine groups, including primary, secondary, and tertiary amines, hydroxy groups, alkoxy groups, such as having from 1 to about 50 carbon atoms, for example from 1 to about 30 carbon atoms, aryloxy groups, such as having from about 5 to about 30 carbon atoms, for example from about 5 to about 20 carbon atoms, alkylthio groups, such as having from 1 to about 50 carbon atoms, for example from 1 to about 30 carbon atoms, arylthio groups, such as having from about 5 to about 30 carbon atoms, for example from about 5 to about 20 carbon atoms, aldehyde groups, ketone groups, ester groups, amide groups, carboxylic acid groups, sulfonic acid groups, and the like. The alkyl, aryl, and arylalkyl groups may also be substituted with groups such as, for example, silyl groups, nitro groups, cyano groups, halide atoms, such as fluoride, chloride, bromide, iodide, and astatide, amine groups, including primary, secondary, and tertiary amines, hydroxy groups, alkoxy groups, such as having from 1 to about 20 carbon atoms, for example from 1 to about 10 carbon atoms, aryloxy groups, such as having from about 5 to about 20 carbon atoms, for example from about 5 to about 10 carbon atoms, alkylthio groups, such as having from 1 to about 20 carbon atoms, for example from 1 to about 10 carbon atoms, arylthio groups, such as having from about 5 to about 20 carbon atoms, for example from about 5 to about 10 carbon atoms, aldehyde groups, ketone groups, ester groups, amide groups, carboxylic acid groups, sulfonic acid groups, and the like. Further, two or more R groups can be joined together to form a ring.

Examples of photochromic azo compounds include azobenzene, 2-methoxyazobenzene, 2-hydroxyazobenzene, 3-methylazobenzene, 3-nitroazobenzene, 3-methoxyazobenzene, 3-hydroxyazobenzene, 4-iodoazobenzene, 4-bromoazobenzene, 4-chloroazobenzene, 4-fluoroazobenzene, 4-methylazobenzene, 4-carbomethoxyazobenzene, 4-acetylazobenzene, 4-carboxyazobenzene, 4-cyanoazobenzene, 4-ethoxyazobenzene, 4-methoxyazobenzene, 4-nitroazobenzene, 4-acetamidoazobenzene, 4-dimethylaminoazobenzene, 4-aminoazobenzene, 4-trimethylammonium azobenzene (with any suitable anion accompanying the ammonium cation, including, for example, $Cl^-$, $Br^-$, $I^-$, $HSO_4^-$, $SO_4^{2-}$, $NO_3^-$, $HCOO^-$, $CH_3COO^-$, $HCO_3^-$, $CO_3^{2-}$, $H_2PO_4^-$, $HPO_4^{2-}$, $PO_4^{3-}$, $SCN^-$, $BF_4^-$, $ClO_4^-$, $SSO_3^-$, $CH_3SO_3^-$, $CH_3C_6H_4SO_3^-$, $SO_3^{2-}$, $BrO_3^-$, $IO_3^-$, $ClO_3^-$, or the like, as well as mixtures thereof), 4-dimethylamino-4'-phenylazobenzene, 4-dimethylamino-4'-hydroxyazobenzene, 4,4'-bis-(dimethylamino)azobenzene, 4-dimethylamino-4'-p-aminophenylazobenzene, 4-dimethylamino-4'-p-acetamidophenylazobenzene, 4-dimethylamino-4'-p-aminobenzylazobenzene, 4-dimethylamino-4'-[13-(p-aminophenyl)ethyl] azobenzene, 4-dimethylamino-4'-mercuric acetate azobenzene, 4-hydroxyazobenzene, 2-methyl-4-hydroxyazobenzene, 4-hydroxy-4'-methylazobenzene, 2,6-dimethyl-4-hydroxyazobenzene, 2,2'-4',6,6'-pentamethyl-4-hydroxyazobenzene, 2,6-dimethyl-2',4',6'-trichloro-4-hydroxyazobenzene, 4-hydroxy-4'-chloroazobenzene, 2,2',4',6'-tetrachloro-4-hydroxyazobenzene, 3-sulfonate-4-hydroxyazobenzene, 2,2'-dimethoxyazobenzene, 3,3'-dinitroazobenzene, 3,3'-dimethylazobenzene, 4,4'-dimethylazobenzene, 4,4'-dimethoxyazobenzene, 4,4'-dinitroazobenzene, 4,4'-dichloroazobenzene, 2,4-dimethoxyazobenzene, 2,6-dimethoxyazobenzene, 4-nitro-4'-methoxyazobenzene, 2,4,6-trimethylazobenzene, 2,3'-dimethoxy-4'-isobutyramidoazobenzene, 2,2',4,4',6,6'-hexamethylazobenzene, 2-hydroxy-5-methylazobenzene, 3,3'-disulfonateazobenzene, 4-methoxy-3'-sulfonateazobenzene, 4-methoxy-4'-sulfonateazobenzene, 2,4-dimethoxy-4'-sulfonateazobenzene, 2,2',4-trimethoxy-5'-sulfonateazobenzene, 4,4'-dimethoxy-3,3'-dicarboxylateazobenzene, 2,2'-azopyridine, 3,3'-azopyridine, 4,4'-azopyridine, 2-phenylazopyridine, 3-phenylazopyridine, 4-phenylazopyridine, 6,6'-azoquinoline, 1-phenylazonaphthalene, 1,1-azonaphthalene, a,2'-azonaphthalene, 2,2'-azonaphthalene, 1-phenylazo-4-naphthol, 1-phenylazo-4-methoxynaphthalene, 3-phenylazo-2-naphthol, 3-phenylazo-2-methoxynaphthalene, 1-(o-hydroxyphenylazo)-2-naphthol, 4-phenylazo-1-naphthylamine, 1-phenylazo-2-naphthylamine, and the like. Polymeric azo materials are also suitable.

Bisimidazoles may be of the general formula

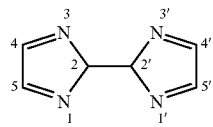

wherein substituents can be present on the 2, 4, 5, 2', 4', and 5' positions. Examples of substituents include hydrogen, alkyl, including cyclic alkyl groups, such as cyclopropyl, cyclohexyl, and the like, and including unsaturated alkyl groups, such as vinyl ($H_2C=CH-$), allyl ($H_2C=CH-CH_2-$), propynyl ($HC\equiv C-CH_2-$), and the like, and having from 1 to about 50 carbon atoms, such as from 1 to about 30 carbon atoms, aryl, such as having from about 5 to about 30 carbon atoms, for example from about 5 to about 20 carbon atoms, arylalkyl, such as having from about 6 to about 50 carbon atoms, for example from about 6 to about 30 carbon atoms, silyl groups, nitro groups, cyano groups, halide atoms, such as fluoride, chloride, bromide, iodide, and astatide, amine groups, including primary, secondary, and tertiary amines, hydroxy groups, alkoxy groups, such as having from 1 to about 50 carbon atoms, for example from 1 to about 30 carbon atoms, aryloxy groups, such as having from about 5 to about 30 carbon atoms, for example from about 5 to about 20 carbon atoms, alkylthio groups, such as having from 1 to about 50 carbon atoms, for example from 1 to about 30 carbon atoms, arylthio groups, such as having from about 5 to about 30 carbon atoms, for example from about 5 to about 20 carbon atoms, aldehyde groups, ketone groups, ester groups, amide groups, carboxylic acid groups, sulfonic acid groups, and the like. The alkyl, aryl, and arylalkyl groups may also be substituted with groups such as, for example, silyl groups, nitro groups, cyano groups, halide atoms, such as fluoride, chloride, bromide, iodide, and astatide, amine groups, including primary, secondary, and tertiary amines, hydroxy groups, alkoxy groups, such as having from 1 to about 20 carbon atoms, for example from 1 to about 10 carbon atoms, aryloxy groups, such as having from about 5 to about 20 carbon atoms, for example from about 5 to about 10 carbon atoms, alkylthio groups, such as having from 1 to about 20 carbon atoms, for example from 1 to about 10 carbon atoms, arylthio groups, such as having from about 5 to about 20 carbon atoms, for example from about 5 to about 10 carbon atoms, aldehyde groups, ketone groups, ester groups, amide groups, carboxylic acid groups, sulfonic acid groups, and the like. Further, two or more R groups can be joined together to form a ring.

Also suitable as the photochromic material are benzo and naphthopyrans (chromenes) of general formulas (the closed form may be colorless/weakly colored; the open form may be differently colored):

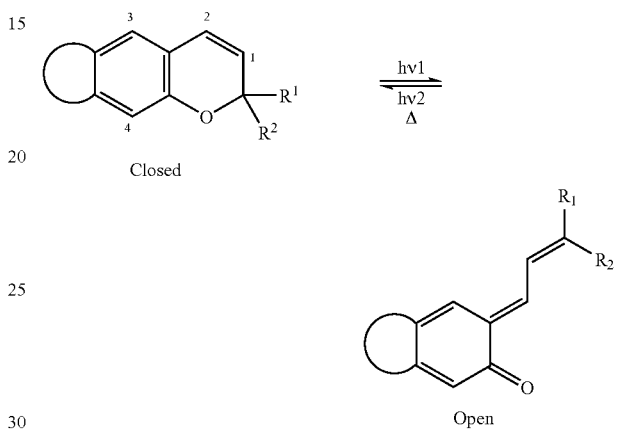

wherein one, two, three or more substituents may be optionally present at the 1, 2, 3 and 4 positions, wherein the substituents and $R_1$ and $R_2$ are each, independently of the other, selected from the group consisting of aromatic groups. The aromatic groups can be substituted, with examples of substituents including alkyl, including cyclic alkyl groups, such as cyclopropyl, cyclohexyl, and the like, and including unsaturated alkyl groups, such as vinyl ($H_2C=CH-$), allyl ($H_2C=CH-CH_2-$), propynyl ($HC\equiv C-CH_2-$), and the like, for example with from 1 to about 50 carbon atoms such as from 1 to about 30 carbon atoms, aryl, for example with from about 6 to about 30 carbon atoms and such as from about 6 to about 20 carbon atoms, arylalkyl, for example with from about 7 to about 50 carbon atoms and such as from about 7 to about 30 carbon atoms, silyl groups, nitro groups, cyano groups, halide atoms, such as fluoride, chloride, bromide, iodide, and astatide, amine groups, including primary, secondary, and tertiary amines, hydroxy groups, alkoxy groups, for example with from 1 to about 50 carbon atoms and such as from 1 to about 30 carbon atoms, aryloxy groups, for example with from about 6 to about 30 carbon atoms and such as from about 6 to about 20 carbon atoms, alkylthio groups, for example with from 1 to about 50 carbon atoms and such as from 1 to about 30 carbon atoms, arylthio groups, for example with from about 6 to about 30 carbon atoms and such as from about 6 to about 20 carbon atoms, aldehyde groups, ketone groups, ester groups, amide groups, carboxylic acid groups, sulfonic acid groups, and the like. Alkyl, aryl, and arylalkyl substituents can also be further substituted with groups such as, for example, silyl groups, nitro groups, cyano groups, halide atoms, such as fluoride, chloride, bromide, iodide, and astatide, amine groups, including primary, secondary, and tertiary amines, hydroxy groups, alkoxy groups, for example with from 1 to about 30 carbon atoms and such as from 1 to about 20 carbon atoms, aryloxy groups, for example with from about 6 to about 30 carbon atoms and such as from about 6 to about 20 carbon atoms, alkylthio groups, for example with from 1 to about 30 carbon atoms and such as from 1 to about 20 carbon atoms, arylthio groups, for example with from about 6 to about 30 carbon atoms and such as from about 6 to about 20 carbon atoms, aldehyde groups, ketone groups, ester groups, amide groups, carboxylic acid groups, sulfonic acid groups, and the like. Further, two or more substituents can be joined together to form a ring.

Specific examples of chromenes include 3,3-diphenyl-3H-naphtho[2,1-b] pyran; 2-methyl-7,7-diphenyl-7H-pyrano-[2,3-g]-benzothyazole; 2,2'-spiroadamantylidene-2H-naphtho-[1,2-b] pyran; and the like.

Synthesis of chromenes is described in detail for example in the following references: P. Bamfield, Chromic Phenomena, Technological applications of color chemistry, RSC, Cambridge, 2001 and J. C. Crano and R. J. Guglielmetti, Organic Photochromic and Thermochromic Compounds, Vol. 1, Main Photochromic Families (Topics in Applied Chemistry), Plenum Press, New York, 1999, the disclosures of which are totally incorporated herein by reference.

Spirodihydroindolizines and related systems (tetrahydro- and hexahydroindolizine are also suitable photochromic materials. The general formulas of spirodihydroindolizines are shown below (the closed form may be colorless/weakly colored; the open form may be differently colored):

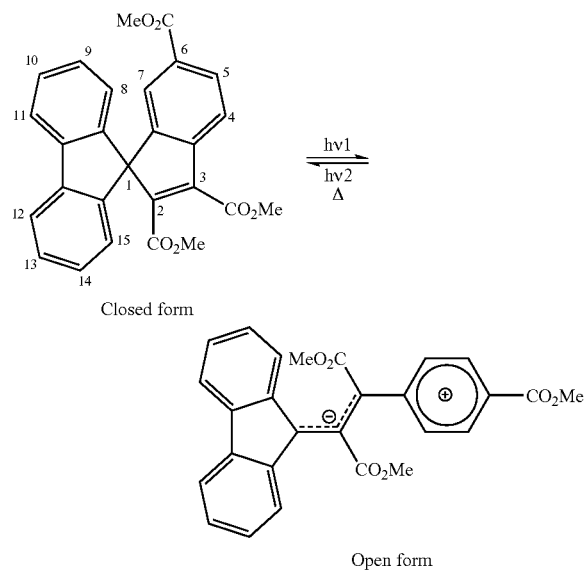

Closed form

Open form wherein one, two, three or more substituents may be optionally present at the 4, 5, 6, 7, 8, 9, 10, 11, 12 and 13 positions. Examples of substituents include (but are not limited to) alkyl, including cyclic alkyl groups, such as cyclopropyl, cyclohexyl, and the like, and including unsaturated alkyl groups, such as vinyl ($H_2C$=CH—), allyl ($H_2C$=CH—$CH_2$—), propynyl (HC≡C—$CH_2$—), and the like, for example with from 1 to about 50 carbon atoms and such as from 1 to about 30 carbon atoms, aryl, for example with from about 6 to about 30 carbon atoms and such as from about 6 to about 20 carbon atoms, arylalkyl, for example with from about 7 to about 50 carbon atoms and such as from about 7 to about 30 carbon atoms, silyl groups, nitro groups, cyano groups, halide atoms, such as fluoride, chloride, bromide, iodide, and astatide, amine groups, including primary, secondary, and tertiary amines, hydroxy groups, alkoxy groups, for example with from 1 to about 50 carbon atoms and such as from 1 to about 30 carbon atoms, aryloxy groups, for example with from about 6 to about 30 carbon atoms and such as from about 6 to about 20 carbon atoms, alkylthio groups, for example with from 1 to about 50 carbon atoms and such as from 1 to about 30 carbon atoms, arylthio groups, for example with from about 6 to about 30 carbon atoms and such as from about 6 to about 20 carbon atoms, aldehyde groups, ketone groups, ester groups, amide groups, carboxylic acid groups, sulfonic acid groups, and the like. The alkyl, aryl, and arylalkyl groups can also be substituted with groups such as, for example, silyl groups, nitro groups, cyano groups, halide atoms, such as fluoride, chloride, bromide, iodide, and astatide, amine groups, including primary, secondary, and tertiary amines, hydroxy groups, alkoxy groups, for example with from 1 to about 30 carbon atoms and such as from 1 to about 20 carbon atoms, aryloxy groups, for example with from about 6 to about 30 carbon atoms and such as from about 6 to about 20 carbon atoms, alkylthio groups, for example with from 1 to about 30 carbon atoms and such as from 1 to about 20 carbon atoms, arylthio groups, for example with from about 6 to about 30 carbon atoms and such as from about 6 to about 20 carbon atoms, aldehyde groups, ketone groups, ester groups, amide groups, carboxylic acid groups, sulfonic acid groups, and the like. Further, two or more substituents can be joined together to form a ring.

Specific examples of photochromic spirodihydroindolizines include for example 4,5-dicarbomethoxy-3H-pyrazole-(3-spiro-9)-fluorene; 1'H-2',3'-6 tricarbomethoxy-spiro(fluorine-9-1'-pyrrolo[1,2-b]-pyridazine]; 1'H-2',3'-dicyano-7-methoxy-carbonyl-spiro[fluorine-9,1'-pyrrolo-[1,2-b] pyridine; and the like.

Spirodihydroindolizines synthesis is described in detail for example in J. C. Crano and R. J. Guglielmetti, Organic Photochromic and Thermochromic Compounds, Vol. 1, Main Photochromic Families (Topics in Applied Chemistry), Plenum Press, New York, 1999, the disclosure of which is totally incorporated herein by reference.

Photochromic quinones of formulas (the form on the left may be colorless/weakly colored; the form on the right may be colored):

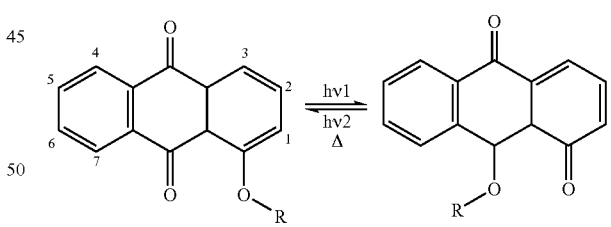

wherein one, two, three or more substituents may be optionally present at the 2, 4, 5, 6 and 7 positions. Examples of substituents and the R moiety include alkyl, including cyclic alkyl groups, such as cyclopropyl, cyclohexyl, and the like, and including unsaturated alkyl groups, such as vinyl ($H_2C$=CH), allyl ($H_2C$=CH—$CH_2$—), propynyl (HC≡C—$CH_2$—), and the like, for example with from 1 to about 50 carbon atoms and such as from 1 to about 30 carbon atoms, aryl, for example with from about 6 to about 30 carbon atoms and such as from about 6 to about 20 carbon atoms, arylalkyl, for example with from about 7 to about 50 carbon atoms and such as from about 7 to about 30 carbon atoms, silyl groups, nitro groups, cyano groups, halide atoms, such as fluoride, chloride, bromide, iodide, and astatide, amine groups, including primary, secondary, and tertiary amines, hydroxy groups, alkoxy groups, for example with from 1 to about 50 carbon atoms and such as from 1 to about 30 carbon atoms, aryloxy groups, for example with from about 6 to about 30 carbon atoms and such as from about 6 to about 20 carbon atoms, alkylthio groups, for example with from 1 to about 50 carbon atoms and such as from 1 to about 30 carbon atoms, arylthio groups, for example with from about 6 to about 30 carbon atoms and such as from about 6 to about 20 carbon atoms, aldehyde groups, ketone groups, ester groups, amide groups, carboxylic acid groups, sulfonic acid groups, and the like. The alkyl, aryl, and arylalkyl groups can also be substituted with groups such as, for example, silyl groups, nitro groups, cyano groups, halide atoms, such as fluoride, chloride, bromide, iodide, and astatide, amine groups, including primary, secondary, and tertiary amines, hydroxy groups, alkoxy groups, for example with from 1 to about 30 carbon atoms and such as from 1 to about 20 carbon atoms, aryloxy groups, for example with from about 6 to about 30 carbon atoms and such as from about 6 to about 20 carbon atoms, alkylthio groups, for example with from 1 to about 30 carbon atoms and such as from 1 to about 20 carbon atoms, arylthio groups, for example with from about 6 to about 30 carbon atoms and such as from about 6 to about 20 carbon atoms, aldehyde groups, ketone groups, ester groups, amide groups, carboxylic acid groups, sulfonic acid groups, and the like. Further, two or more substituents can be joined together to form a ring. In embodiments, the R moiety is hydrogen.

Specific examples of photochromic quinones include for example 1-phenoxy-2,4-dioxyanthraquinone; 6-phenoxy-5,12-naphthacenequinone; 6-phenoxy-5,12-pentacenequinone; 1,3-dichloro-6-phenoxy-7,12-phthaloylpyrene; and the like.

Photochromic quinones synthesis is described in detail for example in J. C. Crano and R. J. Guglielmetti, Organic Photochromic and Thermochromic Compounds, Vol. 1, Main Photochromic Families (Topics in Applied Chemistry), Plenum Press, New York, 1999, the disclosure of which is totally incorporated herein by reference.

Perimidinespirocyclohexadienones of the following formulas are suitable as the photochromic material (the form on the left may be colorless/weakly colored; the form on the right may be differently colored):

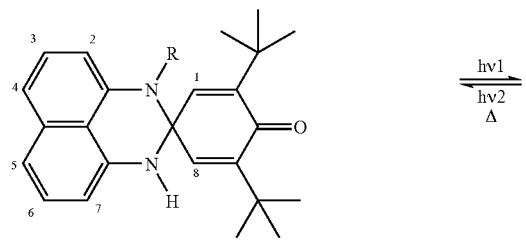

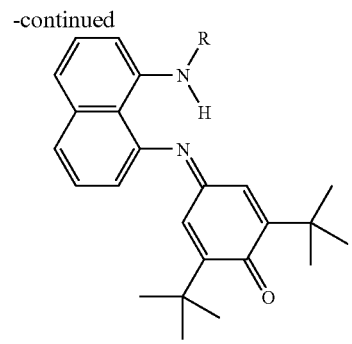

wherein one, two, three or more substituents may be optionally present at the 1, 2, 4, 5, 6, 7 and 8 positions. Examples of substituents and the R moiety include alkyl, including cyclic alkyl groups, such as cyclopropyl, cyclohexyl, and the like, and including unsaturated alkyl groups, such as vinyl (H$_2$C=CH), allyl (H$_2$C=CH—CH$_2$—), propynyl (HC≡C—CH$_2$—), and the like, for example with from 1 to about 50 carbon atoms and such as from 1 to about 30 carbon atoms, aryl, for example with from about 6 to about 30 carbon atoms and such as from about 6 to about 20 carbon atoms, arylalkyl, for example with from about 7 to about 50 carbon atoms and such as from about 7 to about 30 carbon atoms, silyl groups, nitro groups, cyano groups, halide atoms, such as fluoride, chloride, bromide, iodide, and astatide, amine groups, including primary, secondary, and tertiary amines, hydroxy groups, alkoxy groups, for example with from 1 to about 50 carbon atoms and such as from 1 to about 30 carbon atoms, aryloxy groups, for example with from about 6 to about 30 carbon atoms and such as from about 6 to about 20 carbon atoms, alkylthio groups, for example with from 1 to about 50 carbon atoms and such as from 1 to about 30 carbon atoms, arylthio groups, for example with from about 6 to about 30 carbon atoms and such as from about 6 to about 20 carbon atoms, aldehyde groups, ketone groups, ester groups, amide groups, carboxylic acid groups, sulfonic acid groups, and the like. The alkyl, aryl, and arylalkyl groups can also be substituted with groups such as, for example, silyl groups, nitro groups, cyano groups, halide atoms, such as fluoride, chloride, bromide, iodide, and astatide, amine groups, including primary, secondary, and tertiary amines, hydroxy groups, alkoxy groups, for example with from 1 to about 30 carbon atoms and such as from 1 to about 20 carbon atoms, aryloxy groups, for example with from about 6 to about 30 carbon atoms and such as from about 6 to about 20 carbon atoms, alkylthio groups, for example with from 1 to about 30 carbon atoms and such as from 1 to about 20 carbon atoms, arylthio groups, for example with from about 6 to about 30 carbon atoms and such as from about 6 to about 20 carbon atoms, aldehyde groups, ketone groups, ester groups, amide groups, carboxylic acid groups, sulfonic acid groups, and the like. Further, two or more substituents can be joined together to form a ring. In embodiments, the R moiety is hydrogen.

Specific examples of photochromic perimidinespirocyclohexadienones include for example 2,3-dihydro-2-spiro-4'-(2',6'-di-tert-butylcyclohexadien-2',5'-one)-perimidine; 1-methyl-2,3-dihydro-2-spiro-4'-(2',6'-di-tert-butylcyclohexadien-2',5'-one)-perimidine; 2,3-dihydro-2-spiro-4'-[(4H)-2'-tert-butylnaphthalen-1'-one]perimidine; 5,7,9-trimethyl-2,3-dihydro-2-spiro-4'-(2',6'-di-tert-butylcyclohexadien-2',5'-one)-pyrido-[4,3,2, d,e] quinazoline; and the like.

Photochromic perimidinespirocyclohexadienones synthesis is described in detail for example in J. C. Crano and R. J. Guglielmetti, Organic Photochromic and Thermochromic Compounds, Vol. 1, Main Photochromic Families (Topics in Applied Chemistry), Plenum Press, New York, 1999, the disclosure of which is totally incorporated herein by reference.

Photochromic viologens of the following formulas (the form on the left may be colorless/weakly colored; the form on the right may be differently colored):

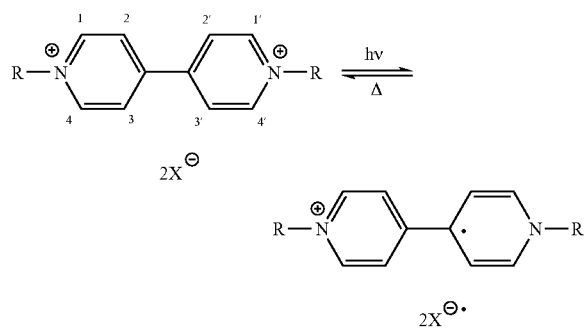

wherein one, two, three or more substituents may be optionally present at the 1, 2, 3, 4, 5, 6, 7 and 8 positions. Examples of substituents and R moiety include alkyl, including cyclic alkyl groups, such as cyclopropyl, cyclohexyl, and the like, and including unsaturated alkyl groups, such as vinyl ($H_2C=CH-$), allyl ($H_2C=CH-CH_2-$), propynyl ($HC\equiv C-CH_2-$), and the like, for example with from 1 to about 50 carbon atoms and such as from 1 to about 30 carbon atoms, aryl, for example with from about 6 to about 30 carbon atoms and such as from about 6 to about 20 carbon atoms, arylalkyl, for example with from about 7 to about 50 carbon atoms and such as from about 7 to about 30 carbon atoms, silyl groups, nitro groups, cyano groups, halide atoms, such as fluoride, chloride, bromide, iodide, and astatide, amine groups, including primary, secondary, and tertiary amines, hydroxy groups, alkoxy groups, for example with from 1 to about 50 carbon atoms and such as from 1 to about 30 carbon atoms, aryloxy groups, for example with from about 6 to about 30 carbon atoms and such as from about 6 to about 20 carbon atoms, alkylthio groups, for example with from 1 to about 50 carbon atoms and such as from 1 to about 30 carbon atoms, arylthio groups, for example with from about 6 to about 30 carbon atoms and such as from about 6 to about 20 carbon atoms, aldehyde groups, ketone groups, ester groups, amide groups, carboxylic acid groups, sulfonic acid groups, and the like. The alkyl, aryl, and arylalkyl groups can also be substituted with groups such as, for example, silyl groups, nitro groups, cyano groups, halide atoms, such as fluoride, chloride, bromide, iodide, and astatide, amine groups, including primary, secondary, and tertiary amines, hydroxy groups, alkoxy groups, for example with from 1 to about 30 carbon atoms and such as from 1 to about 20 carbon atoms, aryloxy groups, for example with from about 6 to about 30 carbon atoms and such as from about 6 to about 20 carbon atoms, alkylthio groups, for example with from 1 to about 30 carbon atoms and such as from 1 to about 20 carbon atoms, arylthio groups, for example with from about 6 to about 30 carbon atoms and such as from about 6 to about 20 carbon atoms, aldehyde groups, ketone groups, ester groups, amide groups, carboxylic acid groups, sulfonic acid groups, and the like. Further, two or more substituents can be joined together to form a ring. In embodiments, the R moiety is hydrogen.

The X moiety can be any anion that acts as a counterion and is needed to compensate the positive charge of the bipyridinium cation. The X moiety can be for example a halogen anion like fluoride, chloride, bromide and iodide ions, tosylate, triflate and other anions.

Specific examples of photochromic viologens include for example N,N'-dimethyl-4,4'-bipyridinium dichloride; N,N'-diethyl-4,4'-bipyridinium dibromide; N-phenyl, N'-methyl-4,4,-bipyridinium dichloride and the like.

Synthesis of photochromic viologens is described in detail for example in J. C. Crano and R. J. Guglielmetti, Organic Photochromic and Thermochromic Compounds, Vol. 1, Main Photochromic Families (Topics in Applied Chemistry), Plenum Press, New York, 1999, the disclosure of which is totally incorporated herein by reference.

Fulgides and fulgimides of the following formulas are suitable as the photochromic material (the open form may be colorless/weakly colored; the closed form may be differently colored):

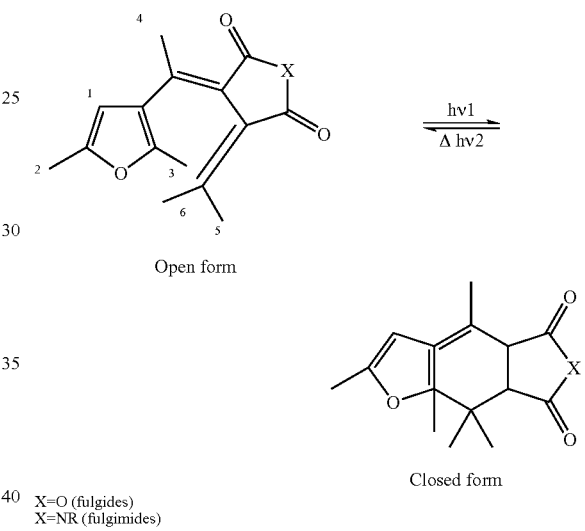

X=O (fulgides)
X=NR (fulgimides)

wherein one, two, three or more substituents may be optionally present at the 1, 2, 4, 5 and 6 positions. Examples of substituents and the R moiety include alkyl, including cyclic alkyl groups, such as cyclopropyl, cyclohexyl, and the like, and including unsaturated alkyl groups, such as vinyl ($H_2C=CH-$), allyl ($H_2C=CH-CH_2-$), propynyl ($HC\equiv C-CH_2-$), and the like, for example with from 1 to about 50 carbon atoms and such as from 1 to about 30 carbon atoms, aryl, for example with from about 6 to about 30 carbon atoms and such as from about 6 to about 20 carbon atoms, arylalkyl, for example with from about 7 to about 50 carbon atoms and such as from about 7 to about 30 carbon atoms, silyl groups, nitro groups, cyano groups, halide atoms, such as fluoride, chloride, bromide, iodide, and astatide, amine groups, including primary, secondary, and tertiary amines, hydroxy groups, alkoxy groups, for example with from 1 to about 50 carbon atoms and such as from 1 to about 30 carbon atoms, aryloxy groups, for example with from about 6 to about 30 carbon atoms and such as from about 6 to about 20 carbon atoms, alkylthio groups, for example with from 1 to about 50 carbon atoms and such as from 1 to about 30 carbon atoms, arylthio groups, for example with from about 6 to about 30 carbon atoms and such as from about 6 to about 20 carbon atoms, aldehyde groups, ketone groups, ester groups, amide groups, carboxylic acid groups, sulfonic acid groups, and the like. The alkyl, aryl, and arylalkyl groups can also be substituted with groups such as, for example, silyl groups, nitro groups, cyano groups, halide atoms, such as fluoride, chloride, bromide, iodide, and astatide, amine groups, including primary, secondary, and tertiary amines, hydroxy groups, alkoxy groups, for example with from 1 to about 30 carbon atoms and such as from 1 to about 20 carbon atoms, aryloxy groups, for example with from about 6 to about 30 carbon atoms and such as from about 6 to about 20 carbon atoms, alkylthio groups, for example with from 1 to about 30 carbon atoms and such as from 1 to about 20 carbon atoms, arylthio groups, for example with from about 6 to about 30 carbon atoms and such as from about 6 to about 20 carbon atoms, aldehyde groups, ketone groups, ester groups, amide groups, carboxylic acid groups, sulfonic acid groups, and the like. Further, two or more substituents can be joined together to form a ring. In embodiments, the R moiety is hydrogen.

Specific examples of fulgides include 1-(p-methoxyphenyl)-ethylidene (isopropylidene) succinic anhydride; 2-[1-(2, 5-dimethyl-3-furyl)-2-methylpropylidene]-3-isopropylidene succinic anhydride; (1,2-dimethyl-4-isopropyl-5-phenyl)-3-pyrryl ethylidene (isopropylidene) succinic anhydride.

Synthesis of photochromic fulgides is described in detail for example in J. C. Crano and R. J. Guglielmetti, Organic Photochromic and Thermochromic Compounds, Vol. 1, Main Photochromic Families (Topics in Applied Chemistry), Plenum Press, New York, 1999, the disclosure of which is totally incorporated herein by reference.

Diarylethenes and related compounds of the following formulas are suitable as the photochromic material (the open form may be colorless/weakly colored; the closed form may be differently colored):

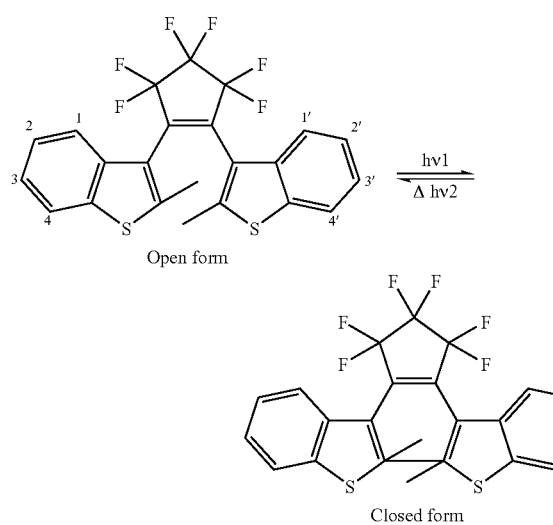

wherein one, two, three or more substituents may be optionally present at the 1, 2, 3, 4, 1', 2', 3' and 4' positions. Examples of substituents include (but are not limited to) alkyl, including cyclic alkyl groups, such as cyclopropyl, cyclohexyl, and the like, and including unsaturated alkyl groups, such as vinyl ($H_2C=CH-$), allyl ($H_2C=CH-CH_2-$), propynyl ($HC\equiv C-CH_2-$), and the like, for example with from 1 to about 50 carbon atoms and such as from 1 to about 30 carbon atoms, aryl, for example with from about 6 to about 30 carbon atoms and such as from about 6 to about 20 carbon atoms, arylalkyl, for example with from about 7 to about 50 carbon atoms and such as from about 7 to about 30 carbon atoms, silyl groups, nitro groups, cyano groups, halide atoms, such as fluoride, chloride, bromide, iodide, and astatide, amine groups, including primary, secondary, and tertiary amines, hydroxy groups, alkoxy groups, for example with from 1 to about 50 carbon atoms and such as from 1 to about 30 carbon atoms, aryloxy groups, for example with from about 6 to about 30 carbon atoms and such as from about 6 to about 20 carbon atoms, alkylthio groups, for example with from 1 to about 50 carbon atoms and such as from 1 to about 30 carbon atoms, arylthio groups, for example with from about 6 to about 30 carbon atoms and such as from about 6 to about 20 carbon atoms, aldehyde groups, ketone groups, ester groups, amide groups, carboxylic acid groups, sulfonic acid groups, and the like. The alkyl, aryl, and arylalkyl groups can also be substituted with groups such as, for example, silyl groups, nitro groups, cyano groups, halide atoms, such as fluoride, chloride, bromide, iodide, and astatide, amine groups, including primary, secondary, and tertiary amines, hydroxy groups, alkoxy groups, for example with from 1 to about 30 carbon atoms and such as from 1 to about 20 carbon atoms, aryloxy groups, for example with from about 6 to about 30 carbon atoms and such as from about 6 to about 20 carbon atoms, alkylthio groups, for example with from 1 to about 30 carbon atoms and such as from 1 to about 20 carbon atoms, arylthio groups, for example with from about 6 to about 30 carbon atoms and such as from about 6 to about 20 carbon atoms, aldehyde groups, ketone groups, ester groups, amide groups, carboxylic acid groups, sulfonic acid groups, and the like. Further, two or more substituents can be joined together to form a ring.

Specific examples of diarylethylenes include 1,2-bis-(2,4-dimethylthiophen-3-yl) perfluorocyclopentene; 1,2-bis-(3,5-dimethylthiophen-3-yl) perfluorocyclopentene; 1,2-bis-(2,4-diphenylthiophen-3-yl) perfluorocyclopentene; and the like.

Synthesis of photochromic diarylethenes is known and is described for example in J. C. Crano and R. J. Guglielmetti, Organic Photochromic and Thermochromic Compounds, Vol. 1, Main Photochromic Families (Topics in Applied Chemistry), Plenum Press, New York, 1999, the disclosure of which is totally incorporated herein by reference.

Triarylmethanes of the following formulas are suitable as the photochromic material (the form on the left may be colorless/weakly colored; the form on the right may be differently colored):

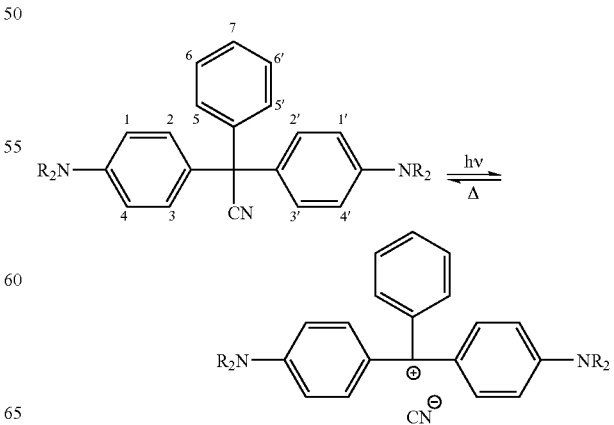

wherein one, two, three or more substituents may be optionally present at the 1, 2, 3, 4, 5, 6, 7, 1', 2', 3, 4', 5' and 6' positions. Examples of substituents and the R moiety include (but are not limited to) alkyl, including cyclic alkyl groups, such as cyclopropyl, cyclohexyl, and the like, and including unsaturated alkyl groups, such as vinyl ($H_2C=CH—$), allyl ($H_2C=CH—CH_2—$), propynyl ($HC\equiv C—CH_2—$), and the like, for example with from 1 to about 50 carbon atoms and such as from 1 to about 30 carbon atoms, aryl, for example with from about 6 to about 30 carbon atoms and such as from about 6 to about 20 carbon atoms, arylalkyl, for example with from about 7 to about 50 carbon atoms and such as from about 7 to about 30 carbon atoms, silyl groups, nitro groups, cyano groups, halide atoms, such as fluoride, chloride, bromide, iodide, and astatide, amine groups, including primary, secondary, and tertiary amines, hydroxy groups, alkoxy groups, for example with from 1 to about 50 carbon atoms and such as from 1 to about 30 carbon atoms, aryloxy groups, for example with from about 6 to about 30 carbon atoms and such as from about 6 to about 20 carbon atoms, alkylthio groups, for example with from 1 to about 50 carbon atoms and such as from 1 to about 30 carbon atoms, arylthio groups, for example with from about 6 to about 30 carbon atoms and such as from about 6 to about 20 carbon atoms, aldehyde groups, ketone groups, ester groups, amide groups, carboxylic acid groups, sulfonic acid groups, and the like. The alkyl, aryl, and arylalkyl groups can also be substituted with groups such as, for example, silyl groups, nitro groups, cyano groups, halide atoms, such as fluoride, chloride, bromide, iodide, and astatide, amine groups, including primary, secondary, and tertiary amines, hydroxy groups, alkoxy groups, for example with from 1 to about 30 carbon atoms and such as from 1 to about 20 carbon atoms, aryloxy groups, for example with from about 6 to about 30 carbon atoms and such as from about 6 to about 20 carbon atoms, alkylthio groups, for example with from 1 to about 30 carbon atoms and such as from 1 to about 20 carbon atoms, arylthio groups, for example with from about 6 to about 30 carbon atoms and such as from about 6 to about 20 carbon atoms, aldehyde groups, ketone groups, ester groups, amide groups, carboxylic acid groups, sulfonic acid groups, and the like. Further, two or more substituents can be joined together to form a ring. In embodiments, the R moiety is hydrogen.

Specific examples of triarylmethanes include compounds X, XI and XII.

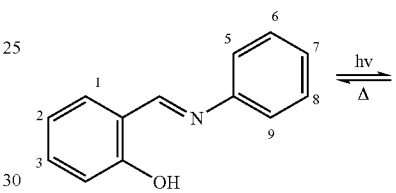

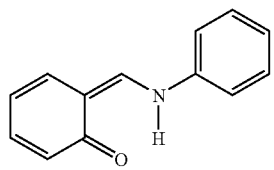

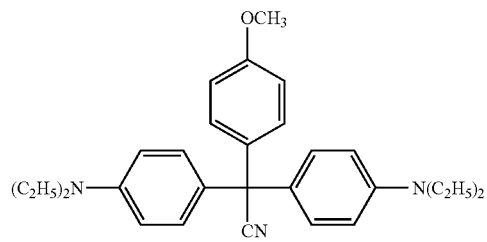

Synthesis of triarylmethanes is described for example in H. Taro, M. Kodo, Bull. Chem. Soc. Jpn., 38(12) p. 2202 (1965), the disclosure of which is totally incorporated herein by reference.

Anils and related compounds of the following formulas are suitable as the photochromic material (the form on the left may be colorless/weakly colored; the form on the right may be differently colored):

wherein one, two, three or more substituents may be optionally present at the 1, 2, 3, 4, 5, 6, 7, 8 and 9. Examples of substituents include (but are not limited to) alkyl, including cyclic alkyl groups, such as cyclopropyl, cyclohexyl, and the like, and including unsaturated alkyl groups, such as vinyl ($H_2C=CH—$), allyl ($H_2C=CH—CH_2—$), propynyl ($HC\equiv C—CH_2—$), and the like, for example with from 1 to about 50 carbon atoms and such as from 1 to about 30 carbon atoms, aryl, for example with from about 6 to about 30 carbon atoms and such as from about 6 to about 20 carbon atoms, arylalkyl, for example with from about 7 to about 50 carbon atoms and such as from about 7 to about 30 carbon atoms, silyl groups, nitro groups, cyano groups, halide atoms, such as fluoride, chloride, bromide, iodide, and astatide, amine groups, including primary, secondary, and tertiary amines, hydroxy groups, alkoxy groups, for example with from 1 to about 50 carbon atoms and such as from 1 to about 30 carbon atoms, aryloxy groups, for example with from about 6 to about 30 carbon atoms and such as from about 6 to about 20 carbon atoms, alkylthio groups, for example with from 1 to about 50 carbon atoms and such as from 1 to about 30 carbon atoms, arylthio groups, for example with from about 6 to about 30 carbon atoms and such as from about 6 to about 20 carbon atoms, aldehyde groups, ketone groups, ester groups, amide groups, carboxylic acid groups, sulfonic acid groups, and the like. The alkyl, aryl, and arylalkyl groups can also be substituted with groups such as, for example, silyl groups, nitro groups, cyano groups, halide atoms, such as fluoride, chloride, bromide, iodide, and astatide, amine groups, including primary, secondary, and tertiary amines, hydroxy groups, alkoxy groups, for example with from 1 to about 30 carbon atoms and such as from 1 to about 20 carbon atoms, aryloxy groups, for example with from about 6 to about 30 carbon atoms and such as from about 6 to about 20 carbon atoms, alkylthio groups, for example with from 1 to about 30 carbon atoms and such as from 1 to about 20 carbon atoms, arylthio groups, for example with from about 6 to about 30 carbon atoms and such as from about 6 to about 20 carbon atoms, aldehyde groups, ketone groups, ester groups, amide groups, carboxylic acid groups, sulfonic acid groups, and the like. Further, two or more substituents can be joined together to form a ring.

Specific examples of anils and related compounds include molecules XIII, XIV, XV and the like.

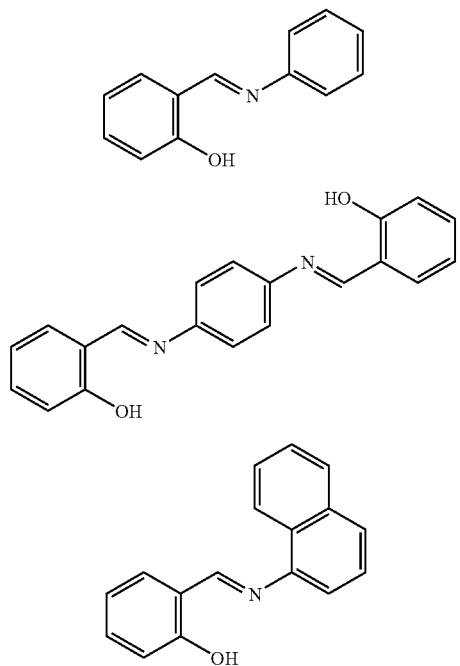

XIII

XIV

XV

Photochromic anils are known and their synthesis has been described for example in K. Kownacki, L. Kaczmarek, A. Grabowska, Chem. Phys. Lett., 210, p. 373 (1993); M. S. M. Rawat, S. Mal, G. Pant, Current Science, 58, p. 796 (1989); P. F. Barbara, P. M., Rentzepis, L. E. Brus, J. Am. Chem. Soc., 102, p. 2786 (1980), the disclosures of which are totally incorporated herein by reference.

Hydrazines may be of the general formula

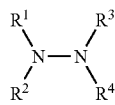

wherein $R^1$, $R^2$, $R^3$, and $R^4$ each, independently of the others, may be hydrogen, alkyl, including cyclic alkyl groups, such as cyclopropyl, cyclohexyl, and the like, and including unsaturated alkyl groups, such as vinyl ($H_2C=CH-$), allyl ($H_2C=CH-CH_2-$), propynyl ($HC\equiv C-CH_2-$), and the like, and having from 1 to about 50 carbon atoms, such as from 1 to about 30 carbon atoms, aryl, such as having from about 5 to about 30 carbon atoms, for example from about 5 to about 20 carbon atoms, arylalkyl, such as having from about 6 to about 50 carbon atoms, for example from about 6 to about 30 carbon atoms, silyl groups, nitro groups, cyano groups, halide atoms, such as fluoride, chloride, bromide, iodide, and astatide, amine groups, including primary, secondary, and tertiary amines, hydroxy groups, alkoxy groups, such as having from 1 to about 50 carbon atoms, for example from 1 to about 30 carbon atoms, aryloxy groups, such as having from about 5 to about 30 carbon atoms, for example from about 5 to about 20 carbon atoms, alkylthio groups, such as having from 1 to about 50 carbon atoms, for example from 1 to about 30 carbon atoms, arylthio groups, such as having from about 5 to about 30 carbon atoms, for example from about 5 to about 20 carbon atoms, aldehyde groups, ketone groups, ester groups, amide groups, carboxylic acid groups, sulfonic acid groups, and the like. The alkyl, aryl, and arylalkyl groups may also be substituted with groups such as, for example, silyl groups, nitro groups, cyano groups, halide atoms, such as fluoride, chloride, bromide, iodide, and astatide, amine groups, including primary, secondary, and tertiary amines, hydroxy groups, alkoxy groups, such as having from 1 to about 20 carbon atoms, for example from 1 to about 10 carbon atoms, aryloxy groups, such as having from about 5 to about 20 carbon atoms, for example from about 5 to about 10 carbon atoms, alkylthio groups, such as having from 1 to about 20 carbon atoms, for example from 1 to about 10 carbon atoms, arylthio groups, such as having from about 5 to about 20 carbon atoms, for example from about 5 to about 10 carbon atoms, aldehyde groups, ketone groups, ester groups, amide groups, carboxylic acid groups, sulfonic acid groups, and the like. Further, two or more R groups can be joined together to form a ring.

Aryl disulfides may be of the general formula

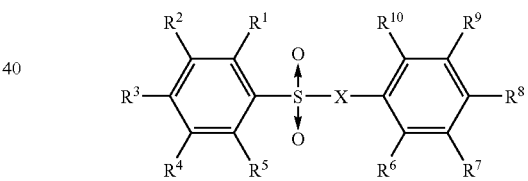

wherein X is a sulfur atom, an oxygen atom, or an $SO_2$ group and $R^1$, $R^2$, $R^3$, $R^4$, $R^5$, $R^6$, $R^7$, $R^8$, $R^9$, and $R^{10}$ each, independently of the others, may be hydrogen, alkyl, including cyclic alkyl groups, such as cyclopropyl, cyclohexyl, and the like, and including unsaturated alkyl groups, such as vinyl ($H_2C=CH-$), allyl ($H_2C=CH-CH_2-$), propynyl ($HC\equiv C-CH_2-$), and the like, and having from 1 to about 50 carbon atoms, such as from 1 to about 30 carbon atoms, aryl, such as having from about 5 to about 30 carbon atoms, for example from about 5 to about 20 carbon atoms, arylalkyl, such as having from about 6 to about 50 carbon atoms, for example from about 6 to about 30 carbon atoms, silyl groups, nitro groups, cyano groups, halide atoms, such as fluoride, chloride, bromide, iodide, and astatide, amine groups, including primary, secondary, and tertiary amines, hydroxy groups, alkoxy groups, such as having from 1 to about 50 carbon atoms, for example from 1 to about 30 carbon atoms, aryloxy groups, such as having from about 5 to about 30 carbon atoms, for example from about 5 to about 20 carbon atoms, alkylthio groups, such as having from 1 to about 50 carbon atoms, for example from 1 to about 30 carbon atoms, arylthio groups, such as having from about 5 to about 30 carbon atoms, for example from about 5 to about 20 carbon atoms, aldehyde groups, ketone groups, ester groups, amide groups, carboxylic acid groups, sulfonic acid groups, and the like. The alkyl, aryl, and arylalkyl groups may also be substituted with groups such as, for example, silyl groups, nitro groups, cyano groups, halide atoms, such as fluoride, chloride, bromide, iodide, and astatide, amine groups, including primary, secondary, and tertiary amines, hydroxy groups, alkoxy groups, such as having from 1 to about 20 carbon atoms, for example from 1 to about 10 carbon atoms, aryloxy groups, such as having from about 5 to about 20 carbon atoms, for example from about 5 to about 10 carbon atoms, alkylthio groups, such as having from 1 to about 20 carbon atoms, for example from 1 to about 10 carbon atoms, arylthio groups, such as having from about 5 to about 20 carbon atoms, for example from about 5 to about 10 carbon atoms, aldehyde groups, ketone groups, ester groups, amide groups, carboxylic acid groups, sulfonic acid groups, and the like. Further, two or more R groups can be joined together to form a ring.

Also suitable are compounds that exhibit tautomeric photochromic phenomena. Examples of these materials include those that undergo photochromic valence tautomerism, those that undergo hydrogen transfer, including keto-enol phototautomerism, aci-nitro phototautomerism, and those that undergo other forms of phototautomerism, such as the naphthacenequinones and their substituted derivatives, as well as polymers containing these moieties, which undergo photochromic transformation between the trans and ana forms, for example as described in, for example, F. Buchholtz et al., Macromolecules, vol. 26, p. 906 (1993), the disclosure of which is totally incorporated herein by reference.

Mixtures of any of the foregoing photochromic materials may also be used.

In embodiments, the photochromic materials do not decompose at the operating temperatures of the ink jet printing process and are compatible with (that is, dissolve or disperse uniformly in) the selected ink vehicle.

The photochromic material may be present in the ink in any effective amount. For example, the photochromic material may be present in the ink in an amount of from about 1 to about 50 percent by weight, such as from about 1 to about 10 percent by weight or from about 3 to about 10 percent by weight, of the ink.

Each of the phase change inks of the ink set also contains in embodiments at least one colorant. The colorant is present in each ink any desired amount, typically from about 0.5 to about 75 percent by weight of the ink vehicle or ink vehicle/propellant mixture, for example from about 1 to about 50 percent by weight of the ink vehicle or ink vehicle/propellant mixture. Examples of suitable colorants include pigments, dyes, mixtures of pigments and dyes, mixtures of pigments, mixtures of dyes, and the like. Any dye or pigment may be chosen, provided that it is capable of being dispersed or dissolved in the ink vehicle and is compatible with the other ink components. Examples of suitable pigments include, but are not limited to, Violet PALIOGEN Violet 5100 (BASF); PALIOGEN Violet 5890 (BASF); HELIOGEN Green L8730 (BASF); LITHOL Scarlet D3700 (BASF); Sunfast® Blue 15:4 (Sun Chemical 249-0592); Hostaperm Blue B2G-D (Clariant); Permanent Red P-F7RK; Hostaperm Violet BL (Clariant); LITHOL Scarlet 4440 (BASF); Bon Red C (Dominion Color Company); ORACET Pink RF (Ciba); PALIOGEN Red 3871 K (BASF); Sunfast® Blue 15:3 (Sun Chemical 249-1284); PALIOGEN Red 3340 (BASF); Sunfast® Carbazole Violet 23 (Sun Chemical 246-1670); LITHOL Fast Scarlet L4300 (BASF); Sunbrite Yellow 17 (Sun Chemical 275-0023); HELIOGEN Blue L6900, L7020 (BASF); Sunbrite Yellow 74 (Sun Chemical 272-0558); Spectra Pac® C Orange 16 (Sun Chemical 276-3016); HELIOGEN Blue K6902, K6910 (BASF); Sunfast® Magenta 122 (Sun Chemical 228-0013); HELIOGEN Blue D6840, D7080 (BASF); Sudan Blue OS (BASF); NEOPEN Blue FF4012 (BASF); PV Fast Blue B2GO1 (Clariant); IRGALITE Blue BCA (Ciba); PALIOGEN Blue 6470 (BASF); Sudan Orange G (Aldrich), Sudan Orange 220 (BASF); PALIOGEN Orange 3040 (BASF); PALIOGEN Yellow 152, 1560 (BASF); LITHOL Fast Yellow 0991 K (BASF); PALIOTOL Yellow 1840 (BASF); NOVOPERM Yellow FGL (Clariant); Lumogen Yellow D0790 (BASF); Suco-Yellow L1250 (BASF); Suco-Yellow D1355 (BASF); Suco Fast Yellow D1 355, D1 351 (BASF); HOSTAPERM Pink E 02 (Clariant); Hansa Brilliant Yellow 5GX03 (Clariant); Permanent Yellow GRL 02 (Clariant); Permanent Rubine L6B 05 (Clariant); FANAL Pink D4830 (BASF); CINQUASIA Magenta (DU PONT), PALIOGEN Black L0084 (BASF); Pigment Black K801 (BASF); and carbon blacks such as REGAL 330™ (Cabot), Carbon Black 5250, Carbon Black 5750 (Columbia Chemical), mixtures thereof and the like. Examples of suitable dyes include Usharect Blue 86 (Direct Blue 86), available from Ushanti Color; Intralite Turquoise 8GL (Direct Blue 86), available from Classic Dyestuffs; Chemictive Brilliant Red 7BH (Reactive Red 4), available from Chemiequip; Levafix Black EB, available from Bayer; Reactron Red H8B (Reactive Red 31), available from Atlas Dye-Chem; D&C Red #28 (Acid Red 92), available from Warner-Jenkinson; Direct Brilliant Pink B, available from Global Colors; Acid Tartrazine, available from Metrochem Industries.; Cartasol Yellow 6GF Clariant; Carta Blue 2GL, available from Clariant.; and the like. Particularly preferred are solvent dyes; within the class of solvent dyes, spirit soluble dyes are preferred because of their compatibility with the ink vehicles of the present invention. Examples of suitable spirit solvent dyes include Neozapon Red 492 (BASF); Orasol Red G (Ciba); Direct Brilliant Pink B (Global Colors); Aizen Spilon Red C-BH (Hodogaya Chemical); Kayanol Red 3BL (Nippon Kayaku); Spirit Fast Yellow 3G; Aizen Spilon Yellow C-GNH (Hodogaya Chemical); Cartasol Brilliant Yellow 4GF (Clariant); Pergasol Yellow CGP (Ciba); Orasol Black RLP (Ciba); Savinyl Black RLS (Clariant); Morfast Black Conc. A (Rohm and Haas); Orasol Blue GN (Ciba); Savinyl Blue GLS (Sandoz); Luxol Fast Blue MBSN (Pylam); Sevron Blue 5GMF (Classic Dyestuffs); Basacid Blue 750 (BASF), Neozapon Black X51 [C.I. Solvent Black, C.I. 12195] (BASF), Sudan Blue 670 [C.I. 61554] (BASF), Sudan Yellow 146 [C.I. 12700] (BASF), Sudan Red 462 [C.I. 260501] (BASF) and the like.

Each of the phase change inks of the ink set, including the photochromic ink, may be made to exhibit substantially the same gloss upon printing. As such, an advantage herein is that the differential gloss realized when overcoating a formed image with a conventional clear photochromic ink may be avoided. Gloss is a measure of an image's shininess, which should be measured after the image has been formed on a print sheet. Gloss may be measured using a Gardiner Gloss metering unit. In embodiments herein, each of the inks used in the ink set, including the photochromic ink(s) of the ink set, are made to have substantially matched gloss. In this regard, each of the inks should have a gloss within about 5 Gardiner gloss units (ggu) of each other, for example a gloss value within from 0 to about 5 ggus or from about 0.5 to about 3 ggus or from about 0.5 to about 2 ggus, of each other. In doing so, the formed image having photochromatic capabilities exhibits substantially no differential gloss, and thus the appearance of the image is uniform.

Optionally, a propellant may be contained in the phase change inks, including in both the regular and photochromic inks. Suitable propellants for the phase change inks, present in any effective amount such as from about 10 to about 90 percent by weight, for example from about 20 to about 50 percent by weight, of the ink generally have melting points of from about 50° to about 150° C., for example from about 80° to about 120° C. In another embodiment, the propellants generally have a boiling point of from about 180° to about 250° C., for example from about 200° to about 230° C. Further, the surface tension of the propellant in its liquid state at the operating temperature of the ink may be from about 20 to about 65 dynes per centimeter, for example from about 40 to about 65 dynes per centimeter, to enhance refill rates, paper wetting, and color mixing. In addition, the propellants ideally have a viscosity at the operating temperature of the ink of from about 1 to about 20 centipoise, for example from about 1 to about 5 centipoise, to enhance refill, jettability, and substrate penetration. The propellant may also be thermally stable in its molten state so that it does not undergo decomposition to yield gaseous products or to form heater deposits.

Examples of suitable propellants for the phase change inks include, for example, water; hydrazine; alcohols, such as ethanol, propanol, butanol, 2,5-dimethyl-2,5-hexanediol, 3-hydroxy benzyl alcohol, and the like; cyclic amines and ureas, including 1,3-dimethyl urea, such as imidazole, substituted imidazoles, including 2-imidazolidone, 2-ethyl imidazole, 1,2,4-triazole, and the like; pyrazole and substituted pyrazoles, including 3,5-dimethyl pyrazole and the like; pyrazine; carboxylic acids; sulfonic acids; aldehydes and ketones; hydrocarbons, such as biphenyl, hexane, benzene; esters; phenols, including phenol, dichlorophenol, other halogen substituted phenols, and cresols; amides, such as propionamide, lactamide, and the like; imides; halocarbons; urethanes; ethers; sulfones, including dimethyl sulfone, methyl sulfone, diethyl sulfone, and diphenyl sulfone; sulfamides, such as methyl sulfamide; sulfonamides, such as ortho, para-toluenesulfonamide, methyl sulfonamide, and the like; phosphites; phosphonates; phosphates; alkyl sulfides, such as methyl sulfide; alkyl acetates, such as methyl acetate; sulfur dioxide; alkylene carbonates, such as propylene carbonate; succinimide; and the like. Sulfones, such as dimethyl sulfone, diethyl sulfone, diphenyl sulfone, and the like, may also be used.

The inks of embodiments may further include conventional additives to take advantage of the known functionality associated with such conventional additives. Such additives may include, for example, biocides, defoamers, slip and leveling agents, plasticizers, pigment dispersants, etc.

Optional biocides may be present in amounts of from about 0.1 to about 1.0 percent by weight of the ink. Suitable biocides include, for example, sorbic acid, 1-(3-chloroallyl)-3,5,7-triaza-1-azoniaadamantane chloride, commercially available as DOWICIL 200 (Dow Chemical Company), vinylene-bis thiocyanate, commercially available as CYTOX 3711 (American Cyanamid Company), disodium ethylenebis-dithiocarbamate, commercially available as DITHONE D14 (Rohm & Haas Company), bis(trichloromethyl)sulfone, commercially available as BIOCIDE N-1386 (Stauffer Chemical Company), zinc pyridinethione, commercially available as zinc omadine (Olin Corporation), 2-bromo-t-nitropropane-1,3-diol, commercially available as ONYXIDE 500 (Onyx Chemical Company), BOSQUAT MB50 (Louza, Inc.), and the like. In addition, other optional additives such as dispersing agents or surfactants may be present in the inks, typically in amounts of from about 0.01 to about 20 percent by weight. Plasticizers that may be used include pentaerythritol tetrabenzoate, commercially available as BENZOFLEX S552 (Velsicol Chemical Corporation), trimethyl titrate, commercially available as CITROFLEX 1 (Monflex Chemical Company), N,N-dimethyl oleamide, commercially available as HALCOMID M-18-OL (C. P. Hall Company), and the like, may be added to the ink vehicle, and may constitute from about 1 to 100 percent of the ink vehicle component of the ink. Plasticizers can either function as the ink vehicle or can act as an agent to provide compatibility between the ink propellant, which generally is polar, and the ink vehicle, which generally is non-polar.

The phase change ink compositions may be prepared by combining all of the ingredients, heating the mixture to at least its melting point, for example from about 70° C. to about 120° C., and stirring the mixture, for example from about 5 seconds to about 10 minutes or more, to obtain a substantially homogeneous, uniform melt. When pigments are the selected colorants, the molten mixture may be subjected to grinding in an attritor or ball mill apparatus to effect dispersion of the pigment in the ink vehicle. For the photochromic ink of the ink set, a compatible blend may be obtained by dissolving the photochromic material and the vehicle in a good solvent for both components. The photochromic material is dissolved in the solvent (typically in a concentration of from about 0.5 to about 5 percent by weight solids; the total solids concentration of the photochromic material and the vehicle is limited by solubility and viscosity, with typical ranges for total solids concentrations being up to about 50 percent by weight, and more typically up to about 20 percent by weight; excessive viscosities may make stirring difficult) using any conventional stirring method. The vehicle may be initially present in the solvent and stirred with the photochromic material. Alternatively, the vehicle can be added to the solvent and mixed after the photochromic material has been dissolved. The stirring steps generally can be carried out at room temperature. The solvent may have a single component or be a mixture. After the photochromic material and the vehicle are mixed, the solvent is removed.

Printed images may be generated with the ink sets described herein by incorporating the ink sets, including at least one photochromic ink, into an ink jet device, for example a thermal ink jet device, an acoustic ink jet device or a piezoelectric ink jet device, and concurrently causing droplets of each of the molten inks of the ink set to be ejected in an imagewise pattern onto an image receiving substrate such as paper or transparency material. Each ink of the ink sets is typically included in a reservoir connected by any suitable feeding device to the corresponding ejecting channels of the ink jet head. In the jetting procedure, the ink jet head may be heated, by any suitable method, to the jetting temperature of the inks. The phase change inks are thus altered from the solid state to a molten state at the jetting temperature.

The inks can also be employed in indirect printing ink jet applications, wherein when droplets of the melted ink are ejected in an imagewise pattern onto an image receiving substrate, the substrate is an intermediate transfer member and the ink in the imagewise pattern is subsequently transferred from the intermediate transfer member to a final recording substrate. The intermediate transfer member may be, for example, a drum.

In embodiments using an intermediate transfer member, the member may be heated to have a temperature on a surface thereof of from about 45° C. to about 80° C. For example, for low energy inks, the surface temperature may be from about 45° C. to about 60° C., and for high energy inks, the surface temperature may be from about 55° C. to about 80° C. The elevated surface temperature permits the ink to remain in a molten state while avoiding offset or ink splitting on the surface of the transfer member, thereby enabling good transfer of the image to the end image receiving substrate such as paper or transparency.

In embodiments, the ink jet system thus includes not only the aforementioned ink sets comprised of at least three differently colored phase change inks, wherein at least one of the colored phase change inks is a photochromic ink that contains a photochromic material such that upon exposure to activating radiation, the at least one photochromic ink changes to a color different from the color of any of the at least three differently colored phase change inks, the system also includes an ink jet device including an ink jet head consisting of one channel for each one of the differently colored phase change inks in the ink set, and a supply path that supplies each of the differently colored phase change inks to the respective channels of the ink jet head, for example from reservoirs containing each of the differently colored phase change inks. As such, a conventional ink jet head may be used, and it is not necessary to add an additional channel dedicated solely to the use of the photochromic ink in the ink jet head. Moreover, the entire image may be concurrently formed with the photochromism built-in to the concurrently formed image, and it is therefore not necessary to separately print with a photochromic ink following formation of the other colors of the image.

Images printed with the ink sets herein include at least one photochromic ink therein, and thus have at least one color of the image that in normal light, for example incandescent light, has a first color state corresponding to a first absorption spectrum, while exhibiting a color change to a second color state corresponding to a second absorption spectrum following exposure of the ink to activating radiation, for example UV light. The photochromic shift from the first state to the second state can be effected by any method suitable for the photochromic material or materials selected for the at least one photochromic ink of the ink set. Examples of methods for inducing the photochromic shift include irradiation with radiation of a suitable wavelength, typically from about 200 to about 400 nanometers. The reverse photochromic effect can be induced by irradiation with visible light, typically in the wavelength range of from about 400 to about 700 nanometers, or by the application of heat.

Embodiments described above will now be further illustrated by way of the following examples.

EXAMPLE 1

150 grams of a yellow ink, commercially available from Xerox for use in the PHASER 8400 Xerox printer, was placed in a beaker and heated in an oven at 140° C. for 3 hours. The melted ink base therein was then stirred for 30 minutes using an overhead stirrer at 175 rpm, following which 4.5 grams of a 1,3-dihydro-1,3,3-trimethylspiro[2H-indole-2,3'-[3H]naphth[2,1-b]-[1,4]oxazine] was added into the mixture over ten minutes. The solution was stirred for an additional two hours, and then filtered through a 0.22 μm nylon filter at 135° C. The ink was then cooled and solidified.

The ink was then placed in the yellow channel of a PHASER 860 printhead. The head was placed in a printer with a head temperature of 140° C., drum temperature of 64° C. and paper preheat of 60° C. A solid ink image was then formed onto the paper. A yellow uniform printing of the whole sheet was made. Upon exposure to a hand held UV light source, the yellow color of the image changed to a noticeable darker color, mainly blue, in the exposed regions. The coloration returned to the original yellow color in less than one minute after the exposure.

EXAMPLE 2

A full color image was then also formed using the photochromic yellow ink described above. An ink set comprised of cyan, magenta, black and the photochromic yellow was used. The yellow channel of the head contained the photochromic yellow ink. Each of the inks was then concurrently jetted from the head to form a full color image. After printing, the image appeared normal. Upon exposure to UV light, the yellow images of the image became noticeably darker.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended by the following claims.

What is claimed is:

1. An ink set comprised of at least three differently colored phase change inks, wherein at least one of the colored phase change inks is a photochromic ink that contains a photochromic material that upon exposure to activating radiation, the photochromic ink changes to a color different from the color of the photochromic ink prior to exposure to the activating radiation, and wherein each of the phase change inks of the ink set has a gloss value within from 0 to about 5 Gardiner gloss units of each other.

2. An ink set according to claim 1, wherein upon exposure to the activating radiation, the at least one photochromic ink changes to a color that is also different from the color of any of the at least three differently colored phase change inks.

3. An ink set according to claim 1, wherein the photochromic material of the at least one photochromic ink comprises spiropyrans, spirooxazines, spirothiopyrans, bisimidazole compounds, chromenes, spirodihydroindolizines, spirotetrahydroindolizines, spirohexahydroindolizines, quinones, perimidinespirocyclohexadienones, viologens, fulgides, fulgimides, diarylethenes, triarylmethanes, anils, hydrazine compounds, aryl disulfide compounds, stilbene compounds, aromatic azo compounds, naphthacenequinones, or mixtures thereof.

4. An ink set according to claim 3, wherein the photochromic material comprises from about 1% to about 10% by weight of the ink.

5. An ink set according to claim 1, wherein each ink of the ink set includes an ink vehicle selected from the group consisting of ethylene/propylene copolymers, urethane derivatives of oxidized synthetic or petroleum waxes, n-paraffinic hydrocarbons, branched paraffinic hydrocarbons, naphthenic hydrocarbons, highly branched hydrocarbons, ethoxylated alcohols, linear alcohols, hydrocarbon-based waxes, modified maleic anhydride hydrocarbon adducts of polyolefins prepared by graft copolymerization, mixtures of monoamides and tetraamides, and mixtures thereof.

6. An ink set according to claim 5, wherein the ink vehicle is a solid at a temperature below about 40° C. and has a viscosity of from about 1 to about 20 centipoise at a jetting temperature of from about 60° C. to about 150°C.

7. An ink set according to claim 5, wherein the ink vehicle is a solid at a temperature below about 40° C. and has a viscosity of from about 5 to about 15 centipoise at a jetting temperature of from about 110° C. to about 120°C.

8. An ink set according to claim 5, wherein the ink vehicle is a solid at a temperature below about 40° C. and has a viscosity of from about 5 to about 15 centipoise at a jetting temperature of from about 125° C. to about 150°C.

9. An ink set according to claim 1, wherein each ink of the ink set includes an ink vehicle in an amount of from about 25% to about 99.5 % by weight of the ink.

10. An ink set according to claim 1, wherein each of the differently colored inks of the ink set includes at least one colorant selected from the group consisting of pigments, dyes, mixtures of pigments and dyes, mixtures of pigments, and mixtures of dyes.

11. An ink set according to claim 10, wherein each of the inks includes the colorant in an amount of from about 0.5% to about 75% by weight of the ink.

12. An ink set according to claim 1, wherein the ink set is comprised of at least four differently colored phase change inks and including at least a cyan phase change ink, a magenta phase change ink, a yellow phase change ink and a black phase change ink.

13. An ink set according to claim 12, wherein at least one of the magenta phase change ink and the yellow phase change ink is the photochromic ink.

14. An ink set according to claim 1, wherein only one ink of the ink set is the photochromic ink.

15. An ink jet system, comprising:
an ink set comprised of at least three differently colored phase change inks, wherein at least one of the colored phase change inks is a photochromic ink that contains a photochromic material that upon exposure to activating radiation, the photochromic ink changes to a color different from the color of the photochromic ink prior to exposure to the activating radiation; and
an ink jet device including an ink jet head consisting of one channel for each one of the differently colored phase change inks in the ink set, and a supply path that supplies each of the differently colored phase change inks to the respective channels of the ink jet head from reservoirs containing each of the differently colored phase change inks, wherein the ink jet device includes an intermediate transfer member, and the inks are ejected in an imagewise pattern onto the intermediate transfer member, and the ink in the imagewise pattern is subsequently transferred from the intermediate transfer member to a final recording substrate.

16. An ink jet system according to claim 15, wherein the ink jet device is a thermal ink jet device, an acoustic ink jet device or a piezoelectric ink jet device.

17. An ink jet system according to claim 15, wherein each ink of the ink set includes an ink vehicle that is a solid at a temperature below 40° C. and has a viscosity of from about 5 to about 15 centipoise at a jetting temperature of from about 110° C. to about 120°C.

18. An ink jet system according to claim 15, wherein each ink of the ink set includes an ink vehicle that is a solid at a temperature below 40° C. and has a viscosity of from about 5 to about 15 centipoise at a jetting temperature of from about 125° C. to about 150°C.

19. An ink jet system according to claim 15, wherein each of the phase change inks of the ink set has a gloss value within from 0 to about 5 Gardiner gloss units of each other.

20. An image forming process, comprising
providing each ink of an ink set comprised of at least three differently colored phase change inks, wherein at least one of the colored phase change inks is a photochromic ink that contains a photochromic material that upon exposure to activating radiation, the photochromic ink changes to a color different from the color of the photochromic ink prior to exposure to the activating radiation, to a corresponding channel of an ink jet head of an ink jet device;
heating the ink jet head to a jetting temperature of the phase change inks of the ink set, thereby rendering each of the phase change inks molten;
concurrently ejecting droplets of each of the molten inks of the ink set in an imagewise pattern onto an intermediate transfer member; and
subsequently transferring the imagewise pattern from the intermediate transfer member to a final image receiving substrate.

21. An image forming process according to claim 20, wherein the jetting temperature is from about 60° C. to about 150°C.

22. An image forming process according to claim 20, wherein the jetting temperature is from about 110° C. to about 120°C.

23. An image forming process according to claim 22, wherein a surface of the intermediate transfer member has a temperature from about 45° C. to about 60°C.

24. An image forming process according to claim 20, wherein the jetting temperature is from about 125° C. to about 150°C.

25. An image forming process according to claim 24, wherein a surface of the intermediate transfer member has a temperature from about 55° C. to about 80°C.

26. An image forming process according to claim 20, wherein the wavelength of the activating radiation is from about 200 to about 1,100 nm.

27. An image forming process according to claim 20, wherein the image receiving substrate is paper or transparency.

28. A process for authenticating a color document, comprising forming the document via an image forming process with an ink set comprised of at least three differently colored phase change inks, wherein at least one of the colored phase change inks is a photochromic ink that contains a photochromic material that upon exposure to activating radiation, the photochromic ink changes to a color different from the color of the photochromic ink prior to exposure to the activating radiation, and
exposing the document to the activating radiation to generate a color change in the photochromic ink indicating the authenticity of the document,
wherein each of the colored phase change inks on the formed document has a gloss value within from 0 to about 5 Gardiner gloss units of each other.

29. A process according to claim 28, wherein the wavelength of the activating radiation is from about 200 to about 1,100 nm.

* * * * *